United States Patent
Satpathy et al.

(10) Patent No.: US 11,470,061 B2
(45) Date of Patent: Oct. 11, 2022

(54) PARALLEL SCHEDULING OF ENCRYPTION ENGINES AND DECRYPTION ENGINES TO PREVENT SIDE CHANNEL ATTACKS

(71) Applicant: Meta Platforms Technologies, LLC, Menlo Park, CA (US)

(72) Inventors: Sudhir Satpathy, Redmond, WA (US); Wojciech Stefan Powiertowski, Kirkland, WA (US); Neeraj Upasani, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 338 days.

(21) Appl. No.: 16/749,250

(22) Filed: Jan. 22, 2020

(65) Prior Publication Data

US 2021/0185023 A1    Jun. 17, 2021

Related U.S. Application Data

(60) Provisional application No. 62/946,770, filed on Dec. 11, 2019.

(51) Int. Cl.
*H04L 9/40* (2022.01)
*G06F 3/01* (2006.01)
(Continued)

(52) U.S. Cl.
CPC ........ *H04L 63/0442* (2013.01); *G02B 27/017* (2013.01); *G06F 3/011* (2013.01);
(Continued)

(58) Field of Classification Search
CPC ....... H04L 9/002; H04L 9/003; H04L 9/0631; H04L 9/088; H04L 9/32; H04L 9/321; H04L 9/3213; H04W 12/67; H04W 12/33
See application file for complete search history.

(56) References Cited

U.S. PATENT DOCUMENTS

| | | | |
|---|---|---|---|
| 10,749,673 B2* | 8/2020 | Jain | H04L 9/12 |
| 2003/0053625 A1* | 3/2003 | Bially | H04L 9/0631 |
| | | | 380/278 |

(Continued)

OTHER PUBLICATIONS

"Announcing the Advanced Encryption Standard (AES)," Federal Information Processing Standards Publication 197, Nov. 26, 2001, 51 pp.

(Continued)

*Primary Examiner* — Raymond N Phan
(74) *Attorney, Agent, or Firm* — Shumaker & Sieffert, P.A.

(57) ABSTRACT

This disclosure describes systems on a chip (SOCs) that prevent side channel attacks on encryption and decryption engines of an electronic device. The SoCs of this disclosure concurrently operate key-diverse encryption and decryption datapaths to obfuscate the power trace signature exhibited by the device that includes the SoC. An example SoC includes an encryption engine configured to encrypt transmission (Tx) channel data using an encryption key and a decryption engine configured to decrypt encrypted received (Rx) channel data using a decryption key that is different from the encryption key. The SoC also includes a scheduler configured to establish concurrent data availability between the encryption and decryption engines and activate the encryption engine and the decryption engine to cause the encryption engine to encrypt the Tx channel data concurrently with the decryption engine decrypting the encrypted Rx channel data using the decryption key that is different from the encryption key.

23 Claims, 13 Drawing Sheets

(51) Int. Cl.
  *G06F 12/1081*  (2016.01)
  *G02B 27/01*  (2006.01)
  *G06F 9/54*  (2006.01)
  *G06F 15/78*  (2006.01)
  *G06F 9/48*  (2006.01)

(52) U.S. Cl.
  CPC ............ *G06F 9/4881* (2013.01); *G06F 9/542* (2013.01); *G06F 9/544* (2013.01); *G06F 12/1081* (2013.01); *G06F 15/7807* (2013.01); *H04L 63/1491* (2013.01)

(56) References Cited

U.S. PATENT DOCUMENTS

| | | | | |
|---|---|---|---|---|
| 2004/0223611 | A1* | 11/2004 | Yan | H04L 65/70 |
| | | | | 380/37 |
| 2014/0351896 | A1* | 11/2014 | Koo | H04W 12/33 |
| | | | | 726/4 |
| 2021/0150069 | A1* | 5/2021 | Elenes | H04L 9/0618 |

OTHER PUBLICATIONS

"SMS4 Encryption Algorithm for Wireless Networks," Version 1.03, May 15, 2008, 6 pp. (translated by Diffie et al.).
Aoki et al., "Specification of Camellia—a 128-bit Block Cipher," NTT and Mitsubishi Electric Corporation, Sep. 26, 2001, 35 pp.
U.S. Appl. No. 16/506,618, filed Jul. 9, 2019, by Atlas et al.

* cited by examiner

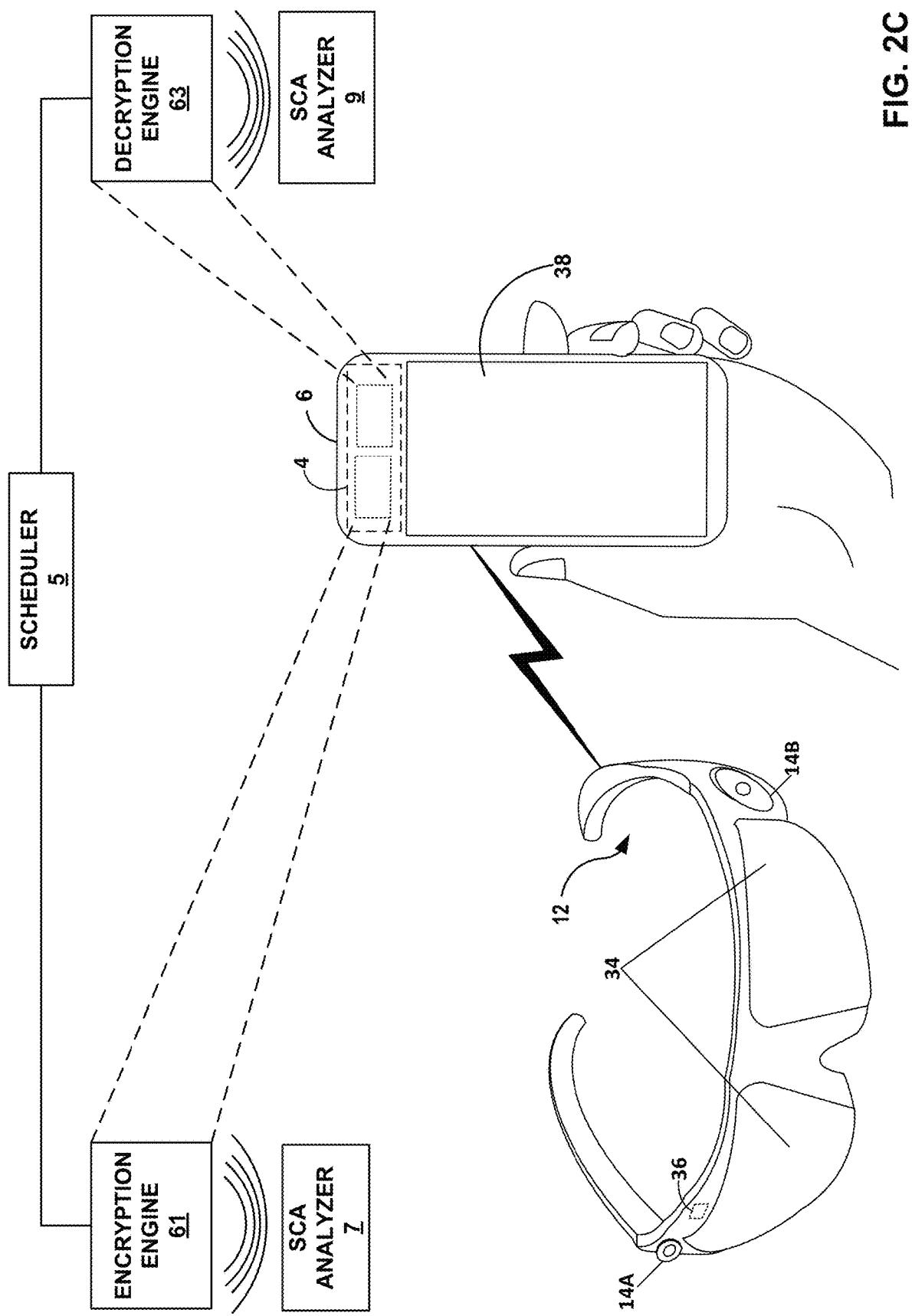

PARALLEL SCHEDULING OF ENCRYPTION ENGINES AND DECRYPTION ENGINES TO PREVENT SIDE CHANNEL ATTACKS

This application claims the benefit of U.S. Provisional Patent Application No. 62/946,770 filed on Dec. 11, 2019, the entire contents of which are incorporated by reference herein.

TECHNICAL FIELD

This disclosure generally relates to data encryption and decryption implemented in various types of computing systems.

BACKGROUND

Many computing systems incorporate content protection or digital rights management technology that includes data encryption and decryption hardware and software. This encryption protects secure data, which is potentially sensitive, private, and/or right-managed and is stored or used on the system, from unauthorized access and exploitation. Examples of computing systems that incorporate encryption and decryption include artificial reality systems. In general, artificial reality is a form of reality that has been adjusted in some manner before presentation to a user, which may include, e.g., a virtual reality, an augmented reality, a mixed reality, a hybrid reality, or some combination and/or derivatives thereof. Artificial reality systems include one or more devices for rendering and displaying content to users. Examples of artificial reality systems may incorporate a head-mounted display (HMD) worn by a user and configured to output artificial reality content to the user. In some examples, the HMD may be coupled (e.g. wirelessly or in tethered fashion) to a peripheral device that performs one or more artificial reality-related functions.

SUMMARY

Some devices that perform encryption and/or decryption are standalone devices that are relatively portable and battery-powered. These features make these devices relatively vulnerable to attack or snooping mechanisms that rely on gleaning information about the hardware functioning of these devices. An example of such an attack mechanism is a so-called "side channel attack" or SCA. SCAs exploit one or more of timing information, current (flow of charge) information, power consumption data, electromagnetic traces and leaks, emitted sounds, etc. In some examples, devices that perform encryption and/or decryption are incorporated into artificial reality systems. Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. Some artificial reality systems incorporate a head-mounted display (HMD) and a peripheral device that are communicatively coupled and function as co-processing devices within the artificial reality system. The HMD is typically worn by a user and configured to output artificial reality content to the user. The peripheral device typically has a form factor similar to that of a handheld mobile computing device, such as a smartphone or personal digital assistant (PDA), and is held in the user's hand. Artificial reality content may represent completely generated content, or a combination of generated content with captured content (e.g., real-world video and/or images).

For portability and other reasons, user-facing artificial reality modalities (e.g., HMDs) and co-processing devices (e.g., peripheral devices in communication with HMDs) are battery-powered, and are therefore often designed for low-power operation. The low-power designs and portable form factors of HMDs and peripheral devices make these devices particularly vulnerable to SCAs, which are often performed using non-invasive, accessible, and relatively cheap off-the-shelf hacking equipment, such as SCA boards, trace analysis software, etc.

In general, this disclosure describes HMDs and peripheral devices that include encryption engines and decryption engines configured to perform encryption and decryption in SCA-resistant ways. In some examples, a scheduler of this disclosure is configured to cause an encryption engine and a decryption engine of a single SoC to operate simultaneously using different keys. The concurrent operation of the encryption engine and decryption engine with different keys causes the encryption engine to provide signal interference that garbles the power signature output by the decryption engine, and causes the decryption engine to provide signal interference that garbles the power signature output by the encryption engine. The cross-interference caused by the scheduler of this disclosure enables artificial reality modalities to exhibit jumbled power traces that render SCAs unsuccessful.

This disclosure focuses on encryption and decryption in the context of encrypted data communications between an HMD and peripheral device of an artificial reality system. However, it will be appreciated that the technical improvements of the configurations described in this disclosure may be incorporated into other types of systems that perform encryption and decryption, as well.

In one example, this disclosure is directed to an SoC that includes an encryption engine, a decryption engine, and a scheduler. The encryption engine is configured to encrypt transmission (Tx) channel data using an encryption key. The decryption engine is configured to decrypt encrypted received (Rx) channel data using a decryption key that is different from the encryption key. The scheduler is configured to establish concurrent data availability with respect to both the encryption engine and the decryption engine, and based on the concurrent data availability with respect to both the encryption engine and the decryption engine, activate the encryption engine and the decryption engine to cause the encryption engine to encrypt the Tx channel data concurrently with the decryption engine decrypting the encrypted Rx channel data using the decryption key that is different from the encryption key.

In another example, this disclosure is directed to an HMD that includes an interface and an SoC. The SoC includes an encryption engine configured to encrypt, for transmission via the interface, transmission (Tx) channel data using an encryption key. The SoC includes a decryption engine configured to decrypt encrypted received (Rx) channel data received via the interface using a decryption key that is different from the encryption key. The SoC includes a scheduler configured to establish concurrent data availability with respect to both the encryption engine and the decryption engine, and based on the concurrent data availability with respect to both the encryption engine and the decryption engine, activate the encryption engine and the decryption engine to cause the encryption engine to encrypt the Tx channel data concurrently with the decryption engine decrypting the encrypted Rx channel data using the decryption key that is different from the encryption key.

In another example, this disclosure is directed to a peripheral device that includes an interface and an SoC. The SoC includes an encryption engine configured to encrypt, for transmission via the interface, transmission (Tx) channel data using an encryption key. The SoC includes a decryption engine configured to decrypt encrypted received (Rx) channel data received via the interface using a decryption key that is different from the encryption key. The SoC includes a scheduler configured to establish concurrent data availability with respect to both the encryption engine and the decryption engine, and based on the concurrent data availability with respect to both the encryption engine and the decryption engine, activate the encryption engine and the decryption engine to cause the encryption engine to encrypt the Tx channel data concurrently with the decryption engine decrypting the encrypted Rx channel data using the decryption key that is different from the encryption key.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 2C is an illustration depicting an example of a peripheral device configured to encrypt input data, and to decrypt and render encrypted artificial reality content in an SCA-resistant manner in accordance with the techniques of the disclosure.

DETAILED DESCRIPTION

Figure 1A:
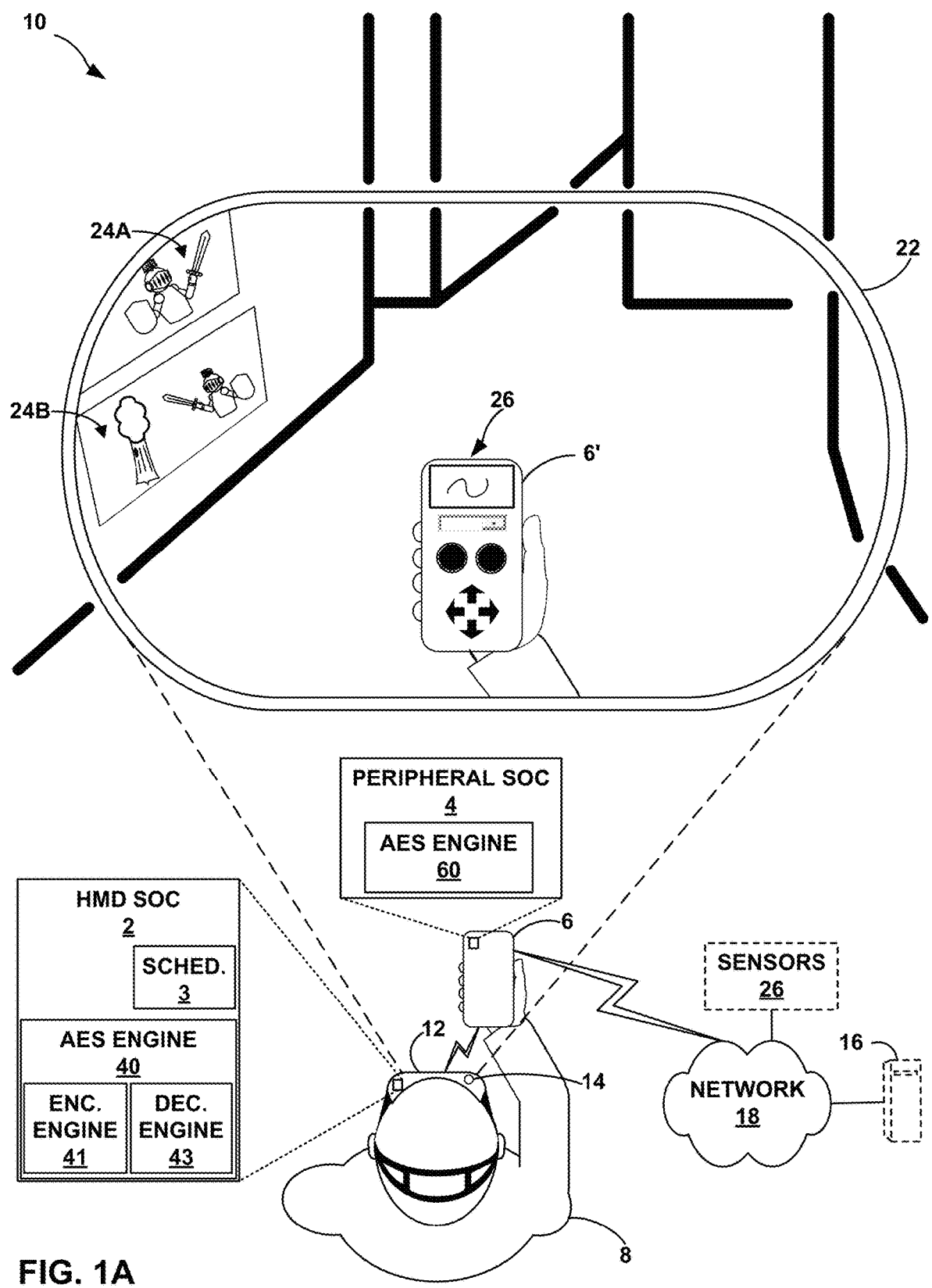
FIG. 1A is an illustration depicting an example multi-device artificial reality system of this disclosure, components of which are configured to thwart SCAs by encrypting input data and/or decrypting encrypted digital content in accordance with aspects of this disclosure.

Multi-device systems sometimes incorporate content protection or digital rights management technology, such as data encryption and decryption, as part of in-system, inter-device communications. A source device that originates an encrypted communication within the system may implement digital data encryption according to various standardized encryption mechanisms. A destination device that receives the encrypted communication for processing beyond simple relaying performs generally reciprocal or "inverse" steps with respect to the encryption mechanisms, in accordance with the inverse steps specified in the corresponding standard according to which the data was encrypted.

Encrypted inter-device communications are often performed in a packetized manner. The packetized communications are packaged as discrete data units (or "packets"), with each packet conforming to a format/structure. Packets of an inter-device encrypted data flow are referred to herein as "crypto packets." Each crypto packet conforms to a format in which an encrypted payload is encapsulated within an "encryption header." Various non-limiting examples of this disclosure are described with respect to peer-to-peer (P2P) unicast data flows between two devices of multi-device artificial reality systems.

Artificial reality systems are becoming increasingly ubiquitous with applications in many fields such as computer gaming, health and safety, industrial fields, and education. As a few examples, artificial reality systems are being incorporated into mobile devices, gaming consoles, personal computers, movie theaters, and theme parks. In general, artificial reality is a form of reality that has been adjusted in some manner before presentation to a user, and may include one or more of virtual reality (VR), augmented reality (AR), mixed reality (MR), hybrid reality, or some combination and/or derivative thereof.

Typical artificial reality systems include one or more devices for rendering and displaying content to users. As one example, a multi-device artificial reality system of this disclosure may include a head-mounted device (HMD) worn by a user and configured to output artificial reality content to the user, and a peripheral device that operates as a co-processing device when paired with the HMD. The artificial reality content may include completely generated content or generated content combined with captured content (e.g., real-world video and/or real-world images). The peripheral device and the HMD may each include one or more SoC integrated circuits (referred to herein simply as "SoCs") that are collectively configured to provide an artificial reality application execution environment.

Typical artificial reality systems include one or more devices for rendering and displaying content to users. As one example, an artificial reality system may incorporate a head-mounted device (HMD) worn by a user and configured to output artificial reality content to the user. In some artificial reality systems, the HMD is communicatively coupled to a peripheral device, which may, in some examples, have a form factor similar to those of common handheld devices, such as a smartphone. The artificial reality content may include completely generated content or generated content combined with captured content (e.g., real-world video and/or real-world images). Many components of artificial reality systems, such as HMDs and peripheral devices, are battery powered. In these examples, HMDs and peripheral devices tend to be designed for low-power operation. The low-power designs and portable nature of HMDs and peripheral devices make HMDs and peripheral devices particularly vulnerable to SCAs. SCAs are often performed using non-invasive, accessible, and relatively cheap off-the-shelf hacking equipment, such as SCA boards, trace analysis software, etc.

FIG. 1A is an illustration depicting an example multi-device artificial reality system 10, components of which are configured to thwart SCAs by encrypting input data and decrypting encrypted digital content in accordance with aspects of this disclosure. Components of multi-device artificial reality system 10 implement encryption and decryption pipelines concurrently according to one or more techniques of this disclosure to obfuscate the power trace signatures output by these components. According to some configurations of this disclosure, components of multi-device artificial reality system 10 implement principles of signal interference to cross-obfuscate encryption-based and decryption-based power trace signatures during simultaneous encryption and decryption operation. In some examples, components of multi-device artificial reality system 10 may schedule encryption and decryption operations to occur simultaneously with different secret keys being used as input operands. In these examples, the overall power trace signature output by the individual component(s) of multi-device artificial reality system 10 is scrambled due to key diversity among the simultaneously executed data pipelines.

Multi-device artificial reality system 10 includes a head-mounted device (HMD) 12 and a peripheral device 6. As shown, HMD 12 is typically worn by a user 8. HMD 12 typically includes an electronic display and optical assembly for presenting artificial reality content 22 to user 8. In addition, HMD 12 includes one or more sensors (e.g., accelerometers) for tracking motion of HMD 12. HMD 12 may include one or more image capture devices 14, e.g., cameras, line scanners, fundal photography hardware, or the like. Image capture devices 14 may be configured for capturing image data of the surrounding physical environment. In some examples, image capture devices 14 include inward-facing camera hardware and/or scanning hardware configured to capture facial images, retina scans, iris scans, etc. of user 8 for user authentication and for other purposes.

HMD 12 is shown in this example as being in communication with (e.g., in wireless communication with or tethered to) peripheral device 6. Peripheral device 6 represents a co-processing device in communication with HMD 12. HMD 12 and/or peripheral device 6 may execute an artificial reality application to construct artificial reality content 22 for display to user 8. For example, HMD 12 and/or peripheral device 6 may construct the artificial reality content based on tracking pose information and computing pose information for a frame of reference, typically a viewing perspective of HMD 12.

As shown in FIG. 1A, one or more devices of multi-device artificial reality system 10 may be connected to a computing network, such as network 18. Network 18 may incorporate a wired network and/or wireless network, such as a local area network (LAN), a wide area network (WAN), a Wi-Fi™ based network or 5G network, an Ethernet® network, a mesh network, a short-range wireless (e.g., Bluetooth®) communication medium, and/or various other computer interconnectivity infrastructures and standards. Network 18 may support various levels of network access, such as to public networks (e.g., the Internet), to private networks (e.g., as may be implemented by educational institutions, enterprises, governmental agencies, etc.), or private networks implemented using the infrastructure of a public network (e.g., a virtual private network or "VPN" that is tunneled over the Internet).

FIG. 1A also illustrates various optional devices that may be included in multi-device artificial reality system 10 or coupled to multi-device artificial reality system 10 via network 18. The optional nature of these devices is shown in FIG. 1A by way of dashed-line borders. One example of an optional device shown in FIG. 1A is console 16. In implementations that include console 16, console 16 may communicate directly with HMD 12, and/or with peripheral device 6 (and thereby, indirectly with HMD 12) to process artificial reality content that HMD 12 outputs to user 8. Another example of optional hardware shown in FIG. 1A is represented by external sensors 26. Multi-device artificial reality system 10 may use external sensors 26 and/or external camera hardware to capture three-dimensional (3D) information within the real-world, physical environment at which user 8 is positioned.

In general, multi-device artificial reality system 10 uses information captured from a real-world, 3D physical environment to render artificial reality content 22 for display to user 8. In the example of FIG. 1A, user 8 views the artificial reality content 22 constructed and rendered by an artificial reality application executing on the combination of HMD 12 peripheral device 6. In some examples, artificial reality content 22 may comprise a combination of real-world imagery (e.g., peripheral device 6 in the form of peripheral device representation 6', representations of walls at the physical environment at which user 8 is presently positioned, a representation of the hand with which user 8 holds peripheral device 6, etc.) overlaid with virtual objects (e.g., virtual content items 24A and 24B, virtual user interface 26, etc.) to produce an augmented reality experience or a mixed reality experience displayed to user 8 via display hardware of HMD 12.

In some examples, virtual content items 24A and 24B (collectively, virtual content items 24) may be mapped to a particular position within artificial reality content 22. As examples, virtual content items 24 may be pinned, locked, or placed to/at certain position(s) within artificial reality content 22. A position for a virtual content item may be fixed, as relative to one of the walls of the real-world imagery reproduced in artificial reality content 22, or to the earth, as examples. A position for a virtual content item may be variable, as relative to peripheral device representation 6' or to the tracked gaze or field of view (FoV) of user 8, as non-limiting examples. In some examples, the particular position of a virtual content item within artificial reality content 22 is associated with a position within the real-world, physical environment (e.g., on a surface of a physical object) at which user 8 is positioned presently.

In this example, peripheral device 6 is a physical, real-world device having a surface on which the artificial reality application executing on computing platforms of multi-device artificial reality system 10 overlays virtual user interface 26. Peripheral device 6 may include one or more presence-sensitive surfaces for detecting user inputs by detecting a presence of one or more objects (e.g., fingers, stylus) touching or hovering over locations of the presence-sensitive surface. In some examples, peripheral device 6 may include one or more output devices, such as a display integrated into the presence-sensitive surface to form an input/output (I/O) component of peripheral device 6.

In some examples, peripheral device 6 may have the form factor of various portable devices, such as a smartphone, a tablet computer, personal digital assistant (PDA), or other handheld device. In other examples, peripheral device 6 may have the form factor of various wearable devices, such as a so-called "smartwatch," "smart ring," or other wearable device. In some examples, peripheral device 6 may be part of a kiosk or other stationary or mobile system. While described above as integrating display hardware, peripheral device 6 need not include display hardware in all implementations.

In the example artificial reality experience shown in FIG. 1A, virtual content items 24 are mapped to positions on a visual representation of a wall of the real-world physical environment at which user 8 is positioned. The example in FIG. 1A also shows that virtual content items 24 partially appear on the visual representation of the wall only within artificial reality content 22, illustrating that virtual content items 24 do not represent any items that exist in the real-world, physical environment at which user 8 is positioned. Virtual user interface 26 is mapped to a surface of peripheral device 6 as represented in peripheral device representation 6'. Multi-device artificial reality system 10 renders virtual user interface 26 for display via HMD 12 as part of artificial reality content 22, at a user interface position that is locked relative to the position of a particular surface of peripheral device 6.

FIG. 1A shows that virtual user interface 26 appears overlaid on peripheral device representation 6' (and therefore, only within artificial reality content 22), illustrating that the virtual content represented in virtual user interface 26 does not exist in the real-world, physical environment at which user 8 is positioned. Multi-device artificial reality system 10 may render one or more virtual content items in response to a determination that at least a portion of the location of virtual content items is in the FoV of user 8. For example, multi-device artificial reality system 10 may render virtual user interface 26 on peripheral device 6 only if peripheral device 6 is within the FoV of user 8.

Various devices of multi-device artificial reality system 10 may operate in conjunction in the artificial reality environment, such that each device may be a separate physical electronic device and/or separate integrated circuits within one or more physical devices. In this example, peripheral device 6 is operationally paired with HMD 12 to jointly operate to provide an artificial reality experience. For example, peripheral device 6 and HMD 12 may communicate with each other as co-processing devices. As one example, when a user performs a user interface-triggering gesture in the virtual environment at a location that corresponds to one of the virtual user interface elements of virtual user interface 26 overlaid on peripheral device representation 6', multi-device artificial reality system 10 detects the user interface and performs an action that is rendered and displayed via HMD 12.

Each of peripheral device 6 and HMD 12 may include one or more SoC integrated circuits configured to support aspects of the artificial reality application described above, such as SoCs operating as co-application processors, encryption engines, decryption engines, sensor aggregators, display controllers, etc. Although each of peripheral device 6 and HMD 12 may include multiple SoCs, FIG. 1A only illustrates HMD SoC 2 of HMD 12 and peripheral SoC 4 of peripheral device 6, for ease of illustration and discussion. To preserve security and digital rights, HMD SoC 2 and peripheral SoC 4 are configured to communicate with one another using encrypted data streams, such as by sending crypto packet flows over a wireless link formed using respective peripheral component interface (PCI) express (PCIe) buses of HMD SoC 2 of HMD 12 and peripheral SoC 4.

To encrypt egress data before transmission to peripheral SoC 4 and to decrypt ingress data after receipt from peripheral SoC 4, HMD SoC 2 invokes AES engine 40. To encrypt egress data before transmission to HMD SoC 2 and to decrypt ingress data after receipt from HMD SoC 2, peripheral SoC 4 invokes AES engine 60. As one example, HMD SoC 2 may encrypt facial images, retina scans, iris scans, etc. of user 8 (e.g., as captured by inward-facing camera hardware and/or fundal photography hardware of image capture devices 14), and send the encrypted data to peripheral SoC 4 for authentication purposes and optionally, for other purposes as well. In this example, peripheral SoC 4 may decrypt the encrypted data received from HMD SoC 2, and process the decrypted data using facial recognition technology, retinal blood vessel pattern recognition technology, etc. to grant/deny biometric authentication to user 8. AES engine 40 includes an encryption engine and a decryption engine implemented separately in silicon. AES engine 60 includes an encryption engine and a decryption engine implemented separately in silicon.

AES engines 40, 60 are described herein as performing encryption and decryption operations that comply with the standardized encryption and decryption mechanisms described in the advanced encryption standard (AES) established by the United States National Institute of Standards and Technology (NIST) as a non-limiting example. It will be appreciated that HMD SoC 2 and peripheral SoC 4 may, in other examples, include encryption engines and decryption engine that implement the SCA-resistance enhancements of this disclosure while complying with other cipher standards, such as SM4 (formerly SMS4, a block cipher standard set forth in the Chinese National Standard for Wireless LAN WAPI), Camellia (developed by Mitsubishi Electric and NTT Corporation of Japan), etc. The techniques of this disclosure can be implemented in digital logic, and are therefore sufficiently scalable and polymorphic to provide SCA resistance within the compliance boundaries of various types of encryption and decryption engines, such as those that comply with the standards listed above and other standardized or non-standardized decryption engines.

While the SCA resistance-enhancing techniques of this disclosure are described with respect to being implemented within multi-device artificial reality system 10 as an example, it will be appreciated that the applicability of the techniques of this disclosure are not limited to artificial reality systems. The data communication techniques of this disclosure can also be implemented to improve data security in other types of computing devices, including, but not limited to, various types of battery-powered SoC-driven and/or application specific integrated circuit (ASIC)-driven technologies.

AES engines 40 and 60 are configured to obfuscate or conceal the current leakage information by decorrelating the data passed through their respective encryption and decryption datapaths from their respective power signatures using one or more of the techniques described in this disclosure. AES engine 40 includes encryption engine 41 and decryption engine 43. HMD SoC 2 includes scheduler 3, which is configured to activate and deactivate encryption engine 41 and decryption engine 43 of AES engine 40. HMD SoC 2 utilizes encryption engine 41 to encrypt egress (or "$T_x$ channel") traffic, such as to form encrypted payloads to be encapsulated in crypto packets destined for peripheral SoC 4. HMD SoC 2 utilizes decryption engine 43 to decrypt ingress (or "$R_x$ channel") traffic, such as to decrypt encrypted payloads decapsulated from crypto packets received from peripheral SoC 4.

Scheduler 3 is configured according to aspects of this disclosure to activate encryption engine 41 and decryption engine 43, respectively, to encrypt $T_x$ channel traffic and to decrypt $R_x$ channel traffic simultaneously, using different encryption and decryption keys (collectively, "secret keys" or "AES keys"). The simultaneous operation of encryption engine 41 and decryption engine 43 creates cross-engine "noise" in that the combination of power trace signatures of encryption engine 41 and decryption engine 43 obfuscate one another when sniffed by SCA hardware, such as an SCA analyzer. As such, HMD 12 outputs a garbled power trace signature that is formed by the dissonant combination of power trace signatures generated by the simultaneous, key-diverse operations of encryption engine 41 and decryption engine 43.

The cross-engine power trace signature obfuscation techniques of this disclosure provide the added benefit of improved throughput. By causing AES engine 40 to process $T_x$ channel traffic and $R_x$ channel traffic in parallel, and without the need to introduce additional logic overhead, scheduler 3 implements the techniques of this disclosure to leverage existing hardware infrastructure while ensuring that AES engine 40 produces egress traffic and processes ingress traffic for storage without leaving encryption/decryption compute resources idle. According to these examples, AES engine 40 improve throughput within an unmodified design.

The cross-engine obfuscation techniques of this disclosure take advantage of the presence of the two engines (namely, encryption engine 41 and decryption engine 43) in a single device (HMD 12) to improve resistance to SCAs without adding any explicit SCA logic to AES engine 40. Scheduler 3 implements the cross-engine power trace signature obfuscation techniques of this disclosure to leverage switching activity in one engine to hide the current signature of the other engine, and vice versa. Scheduler 3 manages $T_x$ channel and $R_x$ channel traffic flows such that both encryption engine 41 and decryption engine 43 are active simultaneously, while using different AES keys.

In some examples, if no traffic is available for one of encryption engine 41 or decryption engine 43 (but traffic is available for the other engine), control logic of HMD SoC 2 may inject redundant random traffic into the inactive engine to mask out switching activity of interest in the active engine. In other examples, if no traffic is available for one of encryption engine 41 or decryption engine 43 (but traffic is available for the other engine), scheduler 3 may cause the active engine to throttle traffic until the inactive engine receives traffic for encryption/decryption, as the case may be. Because encryption engine 41 and decryption engine 43 are implemented separately in silicon at non-overlapping locations, the switching activity of one engine functions as obfuscating noise with respect to the power trace signature of the other engine in cases of simultaneous operation with different AES keys.

AES engine 60 also includes an encryption engine and a decryption engine implemented separately in silicon. Peripheral SoC 4 includes a scheduler configured to activate the encryption engine and decryption engine to process $T_x$ channel and $R_x$ channel traffic simultaneously with different AES keys to obfuscate the overall power trace signature output by peripheral device 6. In this way, the scheduler of peripheral SoC 4 implements the techniques of this disclosure to thwart SCAs that might target peripheral device 6, which in many examples represents a low-profile device. Because the SCA-preventive techniques implemented by peripheral SoC 4 generally correspond to the SCA-preventive techniques described above with respect to HMD SoC 2 and components thereof, the SCA-preventive techniques are not described separately with respect to peripheral SoC 4 purely for the sake of brevity.

Figure 1B:
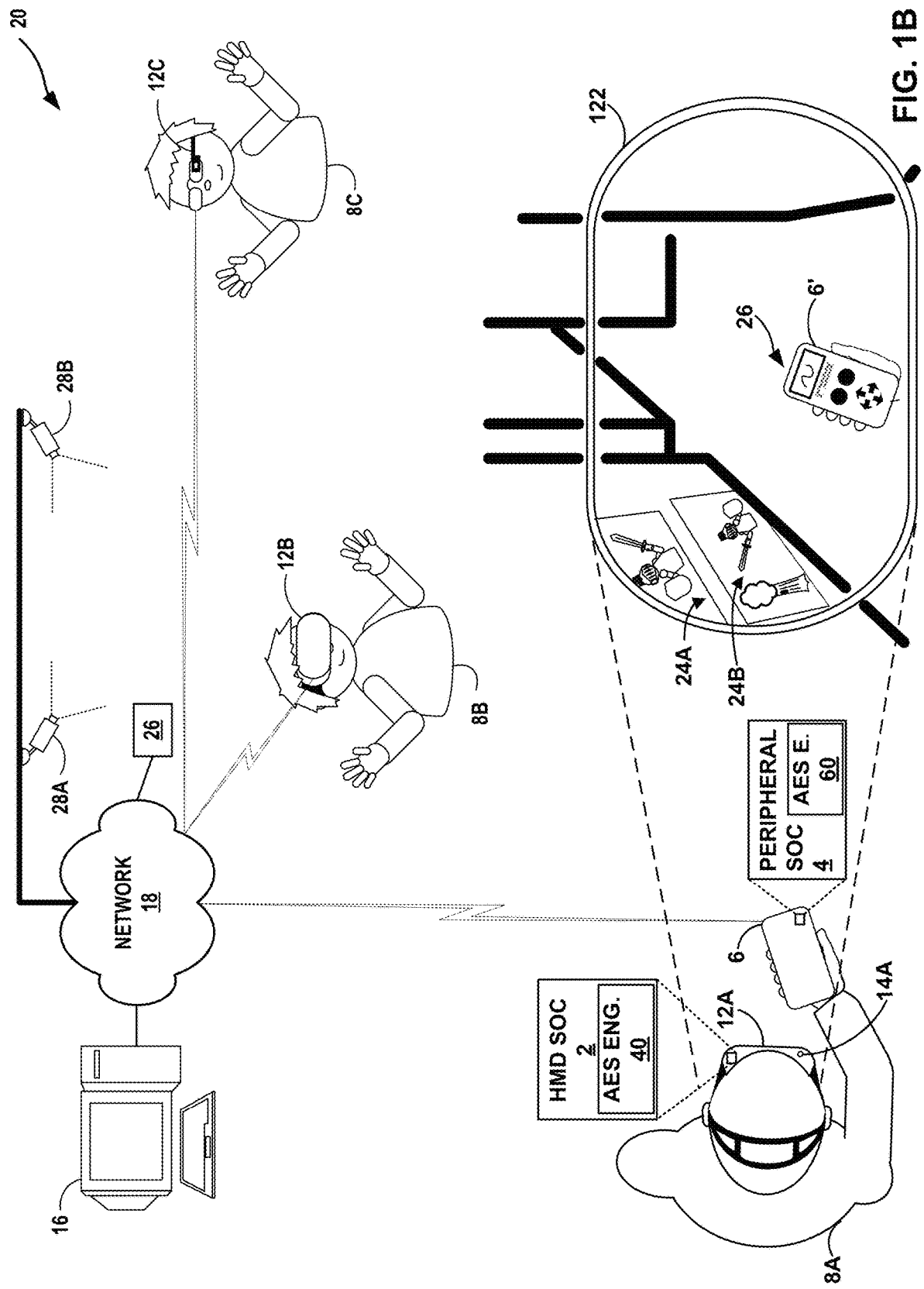
FIG. 1B is an illustration depicting another example artificial reality system that includes components configured to implement the SCA-prevention techniques of this disclosure.

FIG. 1B is an illustration depicting another example multi-device artificial reality system 20 that includes components configured to implement the SCA-prevention techniques of this disclosure. Similar to multi-device artificial reality system 10 of FIG. 1A, schedulers of HMD SoC 2 and peripheral SoC 4 included, respectively, in HMD 12A and peripheral device 6 of FIG. 1B may activate the encryption and decryption datapaths within each of AES engines 40 and 60 simultaneously, with different AES keys being applied between the encryption and decryption datapaths. AES engines 40 and 60 of HMD SoC 2 and peripheral SoC 4 improve data security by obfuscating the power trace signatures output by HMD 12A and peripheral device 6 according to the key-dissonant, simultaneous encryption/decryption operations of this disclosure. Additionally, AES engines 40 and 60 improve throughput in many scenarios by implementing the parallel, simultaneous encryption/decryption operations of this disclosure, while maintaining AES compliance and communication security between HMD SoC 2 and peripheral SoC 4.

In the example of FIG. 1B, multi-device artificial reality system 20 includes external cameras 28A and 28B (collectively, "external cameras 28"), HMDs 12A-12C (collectively, "HMDs 12"), console 16, and sensors 26. As shown in FIG. 1B, multi-device artificial reality system 20 represents a multi-user environment in which an artificial reality application executing on console 16 and/or HMDs 12 presents artificial reality content to each of users 8A-8C (collectively, "users 8") based on a current viewing perspective of a corresponding frame of reference for the respective user 8. That is, in this example, the artificial reality application constructs artificial reality content by tracking and computing pose information for a frame of reference for each of HMDs 12. Multi-device artificial reality system 20 uses data received from external cameras 28 and/or HMDs 12 to capture 3D information within the real-world environment, such as motion by users 8 and/or tracking information with respect to users 8, for use in computing updated pose information for a corresponding frame of reference of HMDs 12.

HMDs 12 operate concurrently within multi-device artificial reality system 20. In the example of FIG. 1B, any of users 8 may be a "player" or "participant" in the artificial reality application, and any of users 8 may be a "spectator" or "observer" in the artificial reality application. HMDs 12 of FIG. 1B may each operate in a substantially similar way to HMD 12 of FIG. 1A. For example, HMD 12A may operate substantially similar to HMD 12 of FIG. 1A, and may receive user inputs by tracking movements of the hands of user 8A.

Each of HMDs 12 implements a respective user-facing artificial reality platform (or co-implements the platform with a co-processing device, as in the case of HMD 12A with peripheral device 6), and outputs respective artificial content, although only artificial reality content 22 output by HMD 12A is shown in FIG. 1B, purely for the purpose of ease of illustration. As shown in FIG. 1B, two or more of HMDs 12 may, but need not necessarily, conform to the same form factor. Various form factors of HMDs 12 are shown in FIG. 1B, including a goggle form factor and an eyeglass form factor. In some use case scenarios, HMDs 12B and/or 12C may also be paired (e.g. wirelessly coupled or tethered to) a portable device that implements generally corresponding features to those described with respect to peripheral device 6.

Figure 2A:
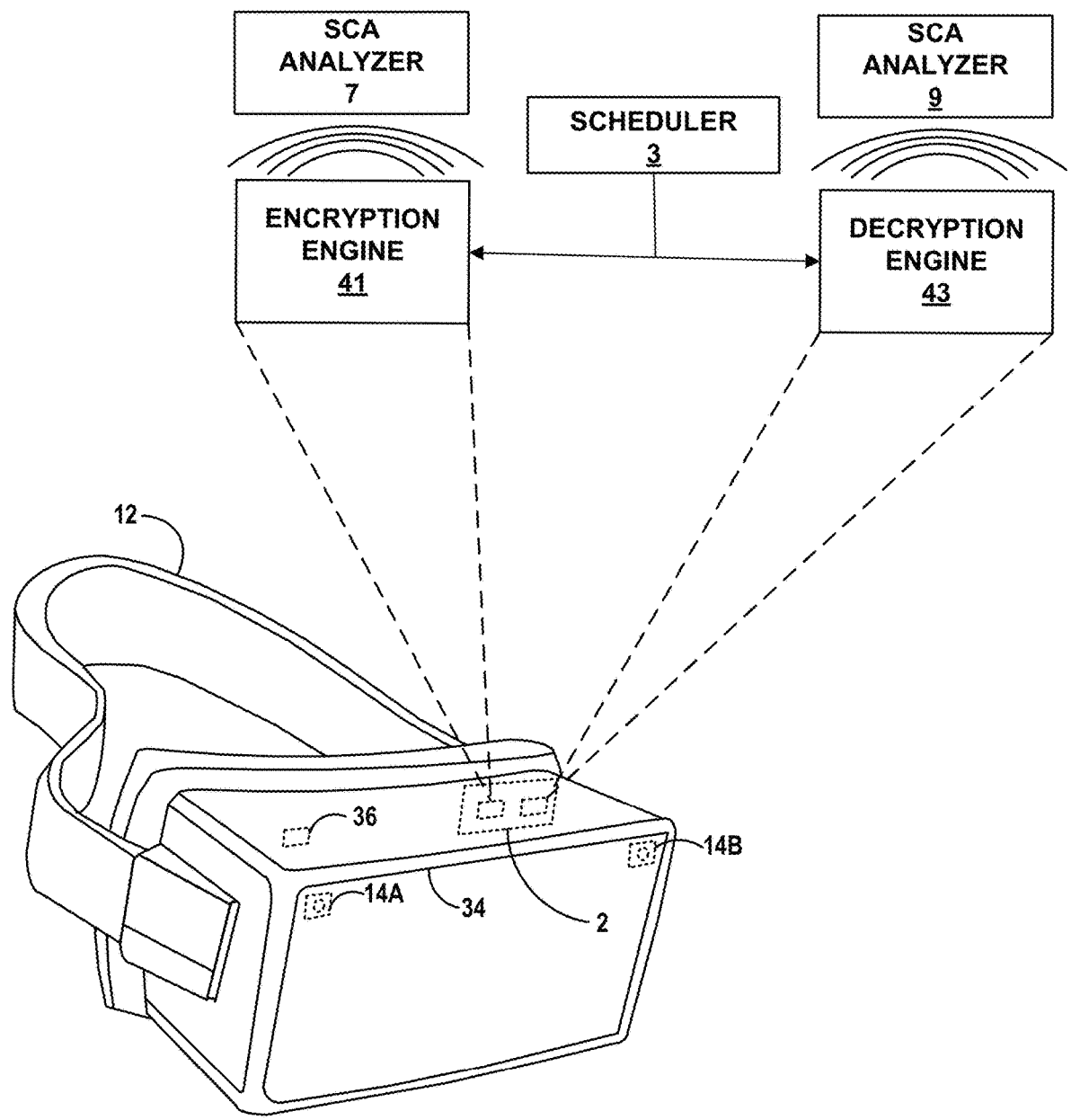
FIG. 2A is an illustration depicting an example HMD configured to encrypt input data before further processing/transmission, and to decrypt and render encrypted artificial reality content in an SCA-resistant manner in accordance with the techniques of the disclosure.

FIG. 2A is an illustration depicting an example HMD configured to encrypt input data before further processing/transmission, and to decrypt and render encrypted artificial reality content in an SCA-resistant manner in accordance with the techniques of the disclosure. HMD 12 of FIG. 2A may be an example of any of HMDs 12 of FIGS. 1A and 1B. In some examples, HMD 12 may be part of an artificial reality system that incorporates other devices and network intermediaries, such as in the examples of multi-device artificial reality systems 10 and 20 illustrated in FIGS. 1A and 1B. In other examples, HMD 12 may operate as a standalone, mobile artificial realty system configured to implement the SCA-thwarting techniques described herein. In the example of FIG. 2A, HMD 12 takes the general form factor of a headset or goggles.

In this example, HMD 12 includes a front rigid body and a band to secure HMD 12 to user 8. In addition, HMD 12 includes an interior-facing electronic display 34 configured to present artificial reality content to user 8. Electronic display 34 may include, be, or be part of any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 34 relative to the front rigid body of HMD 12 is used as a frame of reference, also referred to as a local origin, when tracking the position and orientation of HMD 12 for rendering artificial reality content according to a current viewing perspective of HMD 12 and user 8.

Figure 2B:
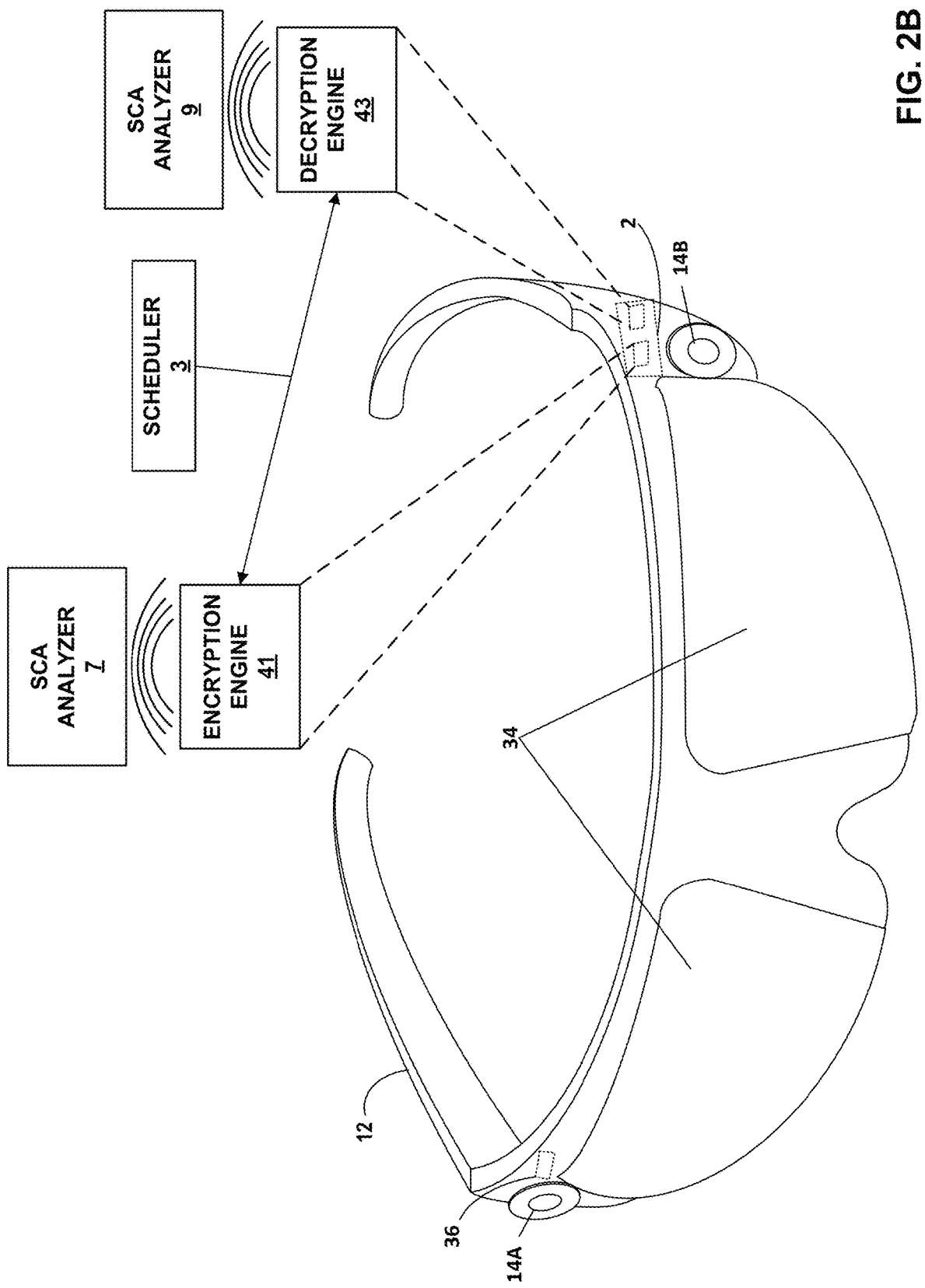
FIG. 2B is an illustration depicting another example of an HMD configured to encrypt input data, and to decrypt and render encrypted artificial reality content in an SCA-resistant manner in accordance with the techniques of the disclosure.

FIG. 2B is an illustration depicting another example of HMD 12 configured to encrypt input data, and to decrypt and render encrypted artificial reality content in an SCA-resistant manner in accordance with the techniques of the disclosure. HMD 12 of FIG. 2B may be an example of any of HMDs 12 of FIGS. 1A and 1B. HMD 12 may be part of an artificial reality system, such as artificial reality systems 10, 20 of FIGS. 1A, 1B, or may operate as a stand-alone, mobile artificial realty system configured to implement the techniques described herein. In the example of FIG. 2B, HMD 12 takes the general form factor of glasses.

In this example, HMD 12 includes a front rigid body and two stems to secure HMD 12 to a user, e.g., by resting over the wearer's ears. Elements of FIG. 2B that share reference numerals with elements of FIG. 2A perform corresponding functionalities, and are not described separately with respect to FIG. 2B for the sake of brevity. In the example of FIG. 2B, electronic display 34 may be split into multiple segments, such as into two segments, with each segment corresponding to a separate lens disposed on the rigid front body of HMD 12. In other examples in accordance with FIG. 2B, electronic display 34 may form a contiguous surface that spans both lenses and the lens-connecting bridge (i.e., the over-the-nose portion) of the rigid front body of HMD 12. In some examples in accordance with the form factor illustrated in FIG. 2B, electronic display 34 may also encompass portions of HMD 12 that connect the lenses of the front rigid body to the stems, or optionally, portions of the stems themselves. These various designs of electronic display 34 in the context of the form factor of HMD 12 shown in FIG. 2B improve accessibility for users having different visual capabilities (e.g. with respect to peripheral vision and/or central vision, nearfield vision and/or distance vision, etc.), eye movement idiosyncrasies, etc.

In the examples illustrated in each of FIGS. 2A & 2B, HMD 12 further includes one or more motion sensors 36, such as one or more accelerometers (also referred to as inertial measurement units or "IMUs") that output data indicative of current acceleration of HMD 12, GPS sensors that output data indicative of a location of HMD 12, radar, or sonar that output data indicative of distances of HMD 12 from various objects, or other sensors that provide indications of a location or orientation of HMD 12 or other objects within a physical environment.

In the examples illustrated in each of FIGS. 2A & 2B, HMD 12 includes integrated image capture devices 14A and 14B (collectively, "image capture devices 14"). Image capture devices 14 may include still image camera hardware, video camera hardware, laser scanners, Doppler® radar scanners, fundus photography hardware, infrared imaging cameras, depth scanners, or the like. Image capture devices 14 may include outward-facing and/or inward-facing image capture hardware, and include any hardware configured to capture image data representative of a surrounding physical environment, and optionally, to preprocess and/or post process the captured image data. Outward-facing camera hardware of image capture devices 14 may capture image data of the physical environment outside of HMD 12, such as, but not limited to, the real-world environment at which user 8 is positioned. Inward-facing camera hardware of image capture devices 14 may capture image data of the wearer of HMD 12, such as facial images and/or retina scans. Other inward-facing sensor hardware of HMD 12 may capture other types of information pertaining to the wearer, such as temperature information or other types of information or metrics.

HMD SoC 2 of HMD 12 includes encryption engine 41 and decryption engine 43, as described above with respect to FIGS. 1A & 1B. As also described above with respect to FIGS. 1A & 1B, scheduler 3 of HMD SoC 2 is configured to operate encryption engine 41 and decryption engine 43 in the SCA-preventive manner of this disclosure. That is, scheduler 3 operates encryption engine 41 and decryption engine 43 in such a way as to decorrelate the power trace information leaked by HMD 12 from the "data-key pair" represented by the data being processed in the encryption and decryption pipelines and the keys being used for encryption/decryption implemented by encryption engine 41 and/or decryption engine 43, respectively.

FIGS. 2A & 2B also illustrate SCA analyzers 7 and 9. Each of SCA analyzers 7 and 9 represents an SCA board (e.g., an FPGA-based board or ASIC-based board), a so-called "skimmer," or any other device configured to snoop on the performance metrics of HMD 12. Hackers may use SCA analyzers 6 and/or 8 to implement various types of SCAs, such as a correlation power attack (CPA) or a direct memory access (DMA) attack. To perform a CPA, SCA analyzer 6 or 8 provides an input data set to HMD 12. A common example of a CPA involves providing one million test vectors that undergo encryption or decryption with a constant secret key, such as would be performed by an encryption engine that performs encryption operations to encrypt input data to form cipher text, or a decryption engine that performs decryption (operations that are reciprocal to the above-described encryption operations) to decrypt the cipher text. Various examples are described with respect to AES-compliant encryption and decryption, but it will be appreciated that the SCA-thwarting techniques of this disclosure are also applicable to encryption and decryption operations that conform to other standards or are not compliant to any presently standard.

Each of SCA analyzers 7 and 9 collects power traces of the AES-compliant system, and analyzes the current traces against a hypothesis that predicts the outcome for a given guess of the key. SCA analyzers 7 and 9 guess the secret key (encryption key and decryption key, respectively) one byte at a time, thereby providing 256 possibilities for every byte. SCA analyzers 7 and 9 compute statistical correlation coefficients between the measured power traces and each hypothesis across all 256 candidate key bytes. SCA analyzers 7 and 9 each select the pairing that produces the highest correlation metric as the secret key guess. An important pre-processing step required for SCA analyzers 7 and 9 to compute the correlation metrics is to first align the power traces. By first aligning the power traces, SCA analyzers 7 and 9 ensure that the value of the power signature gleaned from different traces each correspond to a unique switching event in the AES-compliant SoC (or SoC configured in another, non-AES-compliant way, as the case may be).

According to configurations of this disclosure, encryption engine 41 and decryption engine 43 exploit the reliance of SCA analyzers 7 and 9 on the pre-processing step of aligning the power traces in order to generate the individual hypotheses corresponding to the unique power traces. Encryption engine 41 and decryption engine 43 implement the SCA-thwarting techniques of this disclosure by disrupting the alignment operations that SCA analyzers 7 and 9 perform as pre-processing steps in the above-described CPAs.

Scheduler 3 operates encryption engine 41 and decryption engine 43 according to one or more of the techniques described in this disclosure to obfuscate the overall power trace set collected by SCA analyzers 7 and 9, thereby disrupting the correlation between the power trace set and the target result of the SCAs performed. According to the techniques of this disclosure, scheduler 3 obfuscates the overall power trace set collected by SCA analyzers 7 and 9 using existing hardware infrastructure of HMD 12. In this way, scheduler 3 mangles the essential preprocessing step of power trace alignment upon which SCA analyzers 7 and 9 rely in performing the CPA, without requiring the addition of logic overhead to HMD 12.

SCA analyzers 7 and 9 form the power trace correlations by relying on particular chronological sequences based on reverse engineering the AES-specified procedures to arrive at the cipher text-encryption key pair or the decryption key-decrypted output pair. Scheduler 3 causes encryption engine 41 and decryption engine 43 to operate concurrently using different AES keys to implement the SCA-prevention techniques of this disclosure. By scheduling encryption engine 41 and decryption engine 43 to operate concurrently using different keys, scheduler 3 causes HMD 12 to exhibit power traces that neither SCA analyzer 7 nor SCA analyzer 9 is configured to use to accurately reconstruct as part of performing a CPA. Instead, by using different keys concurrently, encryption engine 41 and decryption engine 43 cause signal interference with respect to one another, thereby scrambling the overall attack surface of HMD 12 such that neither SCA analyzer 7 nor SCA analyzer 9 has access to a power trace signature that accurately reflects the data-key pair of the particular engine under analysis.

FIG. 2C is an illustration depicting an example of a peripheral device configured to encrypt input data, and to decrypt and render encrypted artificial reality content in an SCA-resistant manner in accordance with the techniques of the disclosure. Peripheral SoC 4 of peripheral device 6 performs one or more of the SCA-prevention techniques of this disclosure. HMD 12 of FIG. 2C may be an example of any of HMDs 12 of FIGS. 1A and 1B, and takes the form factor of glasses, as in the case of HMD 12C of FIG. 1B and HMD 12 of FIG. 2B. In the example of FIG. 2C, image capture devices 14 may capture image data representative of various objects, including peripheral device 6 and/or of the hand(s) of user 8 in the physical environment that are within the FoV of image capture devices 14, which may generally correspond to the viewing perspective of HMD 12.

In the example of FIG. 2C, peripheral SoC 6 of peripheral device 6 includes encryption engine 61 and decryption engine 63, which, more specifically, are included in AES engine 60 shown in FIGS. 1A & 1B. Peripheral SoC 6 also includes scheduler 5, which is shown externally to peripheral device 6 in FIG. 2C purely for ease of illustration. In some examples, peripheral device 6 may receive encrypted data (e.g., streaming video data, etc.) over network 18, and may invoke decryption engine 63 to decrypt the encrypted data to be used in the generation and rendering of artificial reality content 22 for display on electronic display 34.

In some examples, peripheral device 6 may receive encrypted data from HMD 12 (e.g., encrypted facial images and/or retina scans of user 8, other authentication information, etc.), and may invoke decryption engine 63 to decrypt the received cipher text for user authentication purposes. Peripheral device 6 may invoke encryption engine 61 to encrypt data for various purposes, such as for encryption prior to transmission over network 18, prior to transmission to HMD 12, or for other purposes, as described above with respect to FIGS. 1A-2B.

Surface 38 of peripheral device 6 represents an input component or a combined input/output component of peripheral device 6. Surface 38 may include sensing capabilities, such as those of a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen), touchpad, buttons, trackball, scroll wheel, or other presence-sensitive hardware that uses capacitive, conductive, resistive, acoustic, or other technology to detect touch and/or hover input.

Surface 38 may enable peripheral device 6 to receive touch input or gesture input without direct contact with surface 38. User 8 may provide these touch or gesture inputs to peripheral device 6 to provide instructions directly to peripheral device 6, or indirectly to HMD 12 and/or other components of an artificial reality system in which HMD 12 is deployed. In some examples, processing circuitry of HMD 12 may utilize image capture devices 14 to analyze configurations, positions, movements, and/or orientations of peripheral device 6, of the hand(s) or digit(s) thereof of user 8 to enable to provide input using gestures such as drawing gestures or typing gestures provided via a graphical keyboard.

Peripheral device 6 can communicate input to HMD 12 (and/or console 16) using wireless communications links (e.g., Wi-Fi™, near-field communication of short-range wireless communication such as Bluetooth®, etc.), or using wired communication links, or combinations thereof, or using other types of communication links. In the example of FIG. 2C, peripheral device 6 is also communicatively coupled to network 18, thereby enabling peripheral device 6 to upload cipher text generated by encryption engine 61 to securely communicate data to remote devices over network 18.

In this way, peripheral device 6 may offload various hardware and resource burdens from HMD 12, which enables low-profile form factor designs of HMD 12. Peripheral device 6 also serves as a communications intermediary between HMD 12 and devices at remote locations, via network 18. Further details of peripheral device 6 are described in U.S. patent application Ser. No. 16/506,618 (filed on Jul. 9, 2019), the entire content of which is incorporated herein by reference.

Peripheral SoC 4 supports various components (e.g., scheduler 5, encryption engine 61, decryption engine 63, etc.), or modules, elements, or operations described herein. In examples in which encryption engine 61 is formed as an integrated circuit (IC), encryption engine 61 represents an "encryption IC." In examples in which decryption engine 63 is formed as an IC, decryption engine 63 represents a "decryption IC." As such, the terms "encryption IC" and "decryption IC" may be used interchangeably with encryption engine 61 and decryption engine 63, respectively.

Inter-SoC communications between HMD SoC 2 and peripheral SoC 4 may be in the form of so-called "crypto packets" that include encrypted payloads and plain text headers. In these examples, HMD 12 may invoke encryption engine 41 to encrypt the payloads before sending crypto packets to peripheral device 6, and may invoke decryption engine 43 to decrypt encrypted payloads obtained from decapsulating crypto packets received from peripheral device 6. Correspondingly, peripheral device 6 may invoke encryption engine 61 to encrypt the payloads before sending crypto packets to HMD 12, and may invoke decryption engine 63 to decrypt encrypted payloads obtained from decapsulating crypto packets received from HMD 12.

Schedulers 3 and 5 of HMD SoC 2 and peripheral SoC 4 may be configured to implement the SCA-prevention techniques of this disclosure by causing (respectively) the encryption engine 41-decryption engine 43 combination and the encryption engine 61-decryption engine 63 combination to operate concurrently using different AES keys. In this way, HMD SoC 2 and peripheral SoC 4 leverage existing logic infrastructure to obfuscate the overall power trace signatures output by each of HMD 12 and peripheral device 6 are jumbled due to cross-engine signal interference, thereby decorrelating the data-key pair processed by the respective encryption pipeline and decryption pipeline from the power trace signature output by the device that includes the respective SoC.

To implement the power signature cross-obfuscation techniques of this disclosure, schedulers 3 and 5 schedule encryption of Tx channel data and decryption of Rx channel data to be performed in parallel. AES engines 40 and 60 select a unique AES key for each different "channel ID" associated with an egress or ingress crypto packet. The channel ID of a crypto packet corresponds to a {source, destination} tuple for the crypto packet, where the source and destination specify particular subsystems of HMD SoC 2 and peripheral SoC 4 (or vice versa, depending on the direction of the crypto packet's traversal). As such, the channel IDs differ between Tx channel crypto packet traffic and Rx channel crypto packet traffic, because, with respect to inter-SoC traffic between HMID SoC 2 and peripheral SoC 4, the sending SoC does not specify any of its own subsystems as a destination. That is, even if Tx channel crypto packets and Rx channel crypto packets flow between the same two subsystems of HMD SoC 2 and peripheral SoC 4, the reversal of the flow direction causes the Tx and Rx channel flows to have different channel ID information.

Again, AES engines 40 and 60 select different AES keys to process data associated with different channel IDs. As such, each of AES engines 40 and 60 selects a different AES key for Tx channel and Rx channel data, regardless of whether or not the Tx and Rx channel data are associated with the same two subsystems. According to the SCA mitigation techniques of this disclosure, scheduler 3 causes encryption engine 41 and decryption engine 43, respectively, to encrypt Tx channel data and decrypt Rx channel data concurrently. In some scenarios, scheduler 3 may cause encryption engine 41 to hold raw input data before encryption, to allow for decryption engine 43 to receive decapsulated encrypted payload data for decryption, thereby enabling parallel operation of encryption engine 41 and decryption engine 43. In other scenarios, scheduler 3 may cause decryption engine 43 to hold decapsulated encrypted payload data before decryption, to allow for encryption engine 41 to receive raw input data for encryption, thereby enabling parallel operation of encryption engine 41 and decryption engine 43.

According to the SCA mitigation techniques of this disclosure, scheduler 5 causes encryption engine 61 and decryption engine 63, respectively, to encrypt Tx channel data and decrypt Rx channel data concurrently. In some scenarios, scheduler 5 may cause encryption engine 61 to hold raw input data before encryption, to allow for decryption engine 63 to receive decapsulated encrypted payload data for decryption, thereby enabling parallel operation of encryption engine 61 and decryption engine 63. In other scenarios, scheduler 5 may cause decryption engine 63 to hold decapsulated encrypted payload data before decryption, to allow for encryption engine 61 to receive raw input data for encryption, thereby enabling parallel operation of encryption engine 61 and decryption engine 63.

In this way, schedulers 3 and 5 implement the techniques of this disclosure to create cross-engine signal interference in AES engines 40 and 60, thereby obfuscating the power trace signatures output by HMD 12 and peripheral device 6, respectively. Schedulers 3 and 5 leverage key diversity between Tx channel encryption and Rx channel decryption to cross-obfuscate the key information under discovery by SCA analyzers 7 and 9, thereby rendering both of the individual attacks carried out by SCA analyzers 7 and 9 unsuccessful. Moreover, by scheduling Tx channel encryption and Rx channel decryption to be performed in parallel, schedulers 3 and 5 improve the overall throughput of AES engines 40 and 60. In this way, the techniques of this disclosure improve data security and privacy while, in some scenarios, also improving throughput. Additionally, the techniques of this disclosure provide the data security improvements of this disclosure without requiring additional logic overhead beyond existing logic infrastructure used for encrypted cross-SoC data communication.

Figure 3:
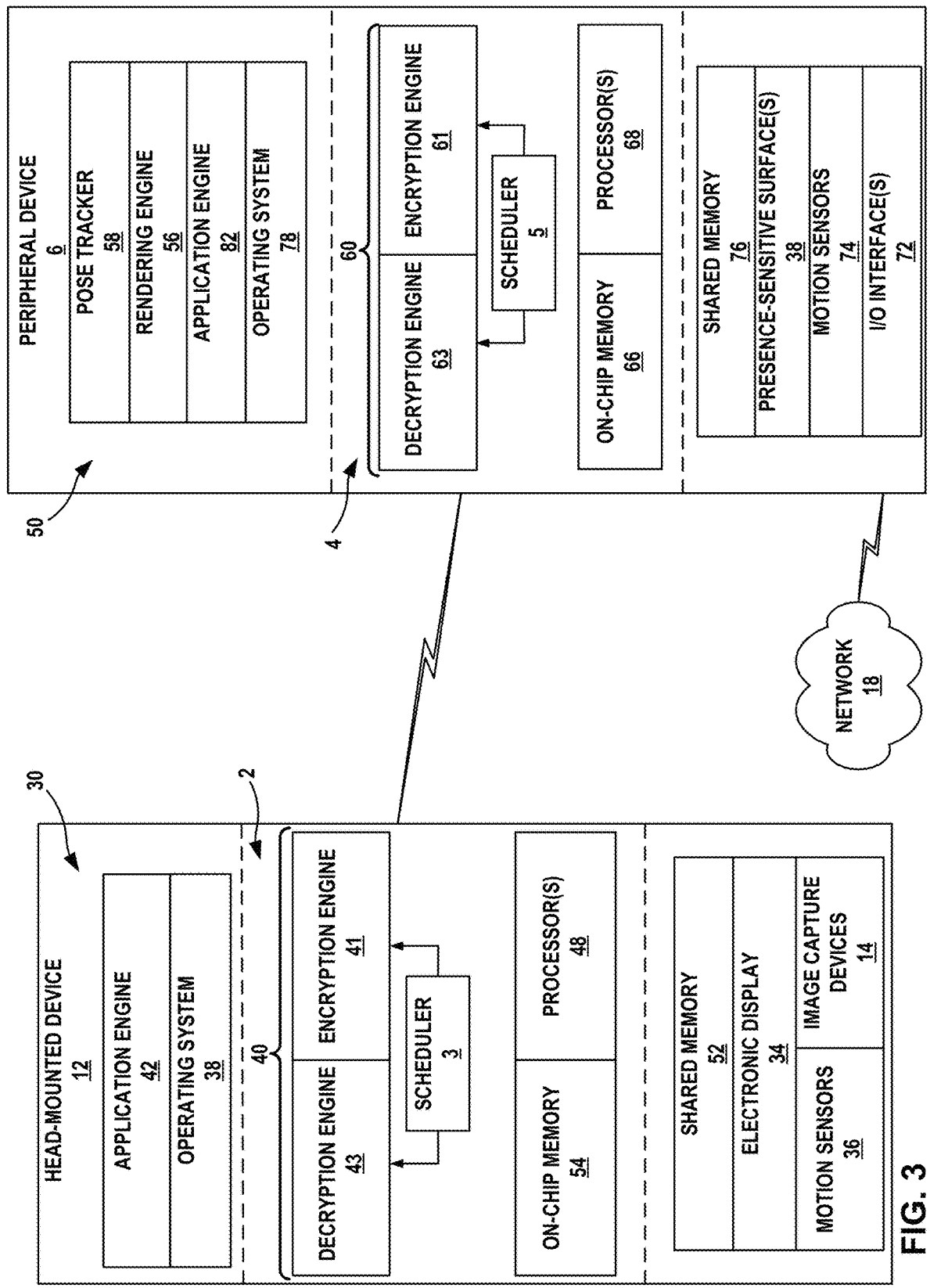
FIG. 3 is a block diagram showing example implementations of an HMD and a peripheral device of this disclosure.

FIG. 3 is a block diagram showing example implementations of HMD 12 and peripheral device 6. In this example, HMD SoC 2 of HMD 12 includes one or more processors 48 and memory 52, in addition to encryption engine 41 and decryption engine 43. Encryption engine 41 and decryption engine 43 form AES engine 40 of HMD SoC 2, although it will be appreciated that encryption engine 41 and/or decryption engine 43 may implement encryption/decryption operations in accordance with standards other than the AES or in non-standard-compliant ways, in other examples within the scope of this disclosure.

Shared memory 52 and processor(s) 48 of HMD 12 may, in some examples, provide a computer platform for executing an operating system 38. Operating system 38 may represent an embedded, real-time multitasking operating system, for instance, or other type of operating system. In turn, operating system 38 provides a multitasking operating environment for executing one or more software components 30, including application engine 42.

Processor(s) 48 may be coupled to one or more of electronic display 34, motion sensors 36, and/or image capture devices 14. Processor(s) 48 are included in HMD SoC 2, which also includes on-chip memory 56. On-chip memory 54 is collocated with processor(s) 48 within a single integrated circuit denoted as HMD SoC 2 in the particular example shown in FIG. 3. Processor(s) 48 may use on-chip memory 54 as a temporary storage location for self-contained data processing performed within HMD SoC 2. Processor(s) 48 and on-chip memory 54 may combine to implement scheduler 3, although scheduler 3 is illustrated as a standalone component of HMD SoC 2 purely for the purposes of ease of illustration and discussion.

HMD 12 is communicatively coupled to peripheral device 6, as shown in FIG. 3. Peripheral device 6 and HMD 12 function in tandem as co-processing devices to deliver the artificial reality experiences to user 8 as described above with respect to FIGS. 1A-2. Peripheral device 6 may offload portions of the computing tasks otherwise performed by HMD 12, thereby enabling a reduced hardware infrastructure and therefore a lower-profile form factor with respect to the design of HMD 12.

Peripheral device 6 includes presence-sensitive surface 38 (described above with respect to FIG. 2), as well as input/output (I/O) interface(s) 72, and motion sensors 74. Peripheral device 6 may invoke I/O interface(s) 72 to send and receive data over network 18, such as cipher text or plain text (unencrypted) data. I/O interface(s) 72 may also incorporate hardware that enables peripheral device 6 to communicate wirelessly with HMD 12. Peripheral device 6 may invoke motion sensors 74 to detect and track motion by user 8 for use in computing updated pose information for a corresponding frame of reference of HMD 12.

Peripheral SoC 4 of peripheral device 6 includes encryption engine 61, decryption engine 63, on-chip memory 66, and one or more processors 68. On-chip memory 66 represents memory collocated with processor(s) 68 within a single integrated circuit denoted as peripheral SoC 4 in the particular example shown in FIG. 3. Processor(s) 68 may use on-chip memory 66 as a temporary storage location for self-contained data processing performed within peripheral SoC 4. Processor(s) 68 and on-chip memory 66 may combine to implement scheduler 5, although scheduler 5 is illustrated as a standalone component of peripheral SoC 4 purely for the purposes of ease of illustration and discussion.

Encryption engine 61 and decryption engine 63 form AES engine 60 of peripheral SoC 4, although it will be appreciated that encryption engine 61 and/or decryption engine 63 may implement encryption/decryption operations in accordance with standards other than the AES or in non-standard-compliant ways, in other examples within the scope of this disclosure. Shared memory 76 and processor(s) 68 of peripheral device 6 provide a computer platform for executing an operating system 78. Operating system 78 may represent an embedded, real-time multitasking operating system, for instance, or other type of operating system. In turn, operating system 78 provides a multitasking operating environment for executing one or more software components 50.

Apart from operating system 78, software components 50 include an application engine 82, a rendering engine 56, and a pose tracker 58. In some examples, software components 50 may not include rendering engine 56, and HMD 12 may perform the rendering functionalities without co-processing with peripheral device 6. In general, application engine 82, when invoked, provides functionality to provide and present an artificial reality application, e.g., a teleconference application, a gaming application, a navigation application, an educational application, a training application, a simulation application, or the like, to user 8 via HMD 12. Application engine 82 may include, for example, one or more software packages, software libraries, hardware drivers, and/or Application Program Interfaces (APIs) for implementing an artificial reality application. Responsive to control by application engine 82, rendering engine 56 generates artificial reality content 22 (e.g., incorporating 3D artificial reality content) for display to user 8 by application engine 42 of HMD 12.

Application engine 82 and rendering engine 56 construct artificial reality content 22 for display to user 8 in accordance with current pose information for a frame of reference, typically a viewing perspective of HMD 12, as determined by pose tracker 58. Based on the current viewing perspective as determined by pose tracker 58, rendering engine 56 constructs artificial reality content 22 (e.g., 3D artificial content) which may in some cases be overlaid, at least in part, upon the real-world 3D environment of user 8.

During this process, pose tracker 58 operates on sensed data received from HMD 12, such as movement information and user commands, and, in some examples, data from any external sensors 26 (shown in FIGS. 1A & 1B), to capture 3D information within the real-world environment, such as motion by user 8 and/or feature tracking information with respect to user 8. Based on the sensed data, pose tracker 58 determines a current pose for the frame of reference of HMD 12 and, in accordance with the current pose, constructs artificial reality content 22 for communication, via one or more I/O interfaces 72, to HMD 12 for display to user 8.

While HMD 12 and peripheral device 6 may communicate on a number of levels, FIG. 3 is primarily described with respect to communications at the level represented by HMD SoC 2 and peripheral SoC 4. Shared memory 52 includes the SMEM of HMD SoC 2, and shared memory 76 includes the SMEM of peripheral SoC 4. Similarly, processor(s) 48 include a security processor of HMD SoC 2, and processor(s) 68 include a security processor of peripheral SoC 4.

Processor(s) 48 and processor(s) 68 invoke encryption engines 41 and 61, respectively, to encrypt transmission (Tx) channel data, which represents outgoing data with a destination of the other SoC. The respective traversal path of each crypto packet is described by a "channel ID", which is unique to a {source subsystem, destination subsystem} tuple. The source subsystem identifies a discrete subsystem of the originating SoC, and the destination subsystem identifies a discrete subsystem of the destination SoC.

Processor(s) 48 and processor(s) 68 are configured to select the encryption key to be applied by encryption engine 41 or 61 for a given data segment based on the channel ID of the crypto packet that will be formed using the data segment undergoing encryption. Similarly, processor(s) 48 and processor(s) 68 may select the corresponding decryption keys to be applied by decryption engines 43 and 63 to decrypt a decapsulated encrypted payload based on the channel ID of the ingress crypto packet that carried the payload. In this way, processor(s) 48 and processor(s) 68 use multi-key encryption and decryption with keys varying on a channel ID-unique basis.

Channel IDs differ between opposing traffic flows between the same two subsystems of HMD SoC 2 and peripheral SoC 4. For example, the channel ID for a crypto packet traversing from a first subsystem of HMD SoC 2 to a first subsystem of peripheral SoC 4 is different from the channel ID for a crypto packet traversing from the first subsystem of peripheral SoC 4 to the first subsystem of HMD SoC 2. As such, the channel ID of ingress traffic at HMD SoC 2 always differs from the channel ID of egress traffic at HMD SoC 2, whether or not the two communicating subsystems are the same, because of the opposing directionality of ingress and egress crypto packet flows. Similarly, the channel ID of ingress traffic at peripheral SoC 4 always differs from the channel ID of egress traffic at peripheral SoC 4, whether or not the two communicating subsystems are the same, because of the opposing directionality of ingress and egress crypto packet flows.

Schedulers 3 and 5 leverage the channel ID diversity between ingress and egress crypto packet traffic flows to obfuscate the power signatures output by HMD 12 and peripheral device 6, respectively. For example, scheduler 3 may schedule operations such that encryption engine 41 and decryption engine 43, respectively, encrypt egress payloads and decrypt decapsulated ingress payloads concurrently. Again, encryption engine 41 and decryption engine 43 apply different AES keys, because the channel IDs associated with the data processed by encryption engine 41 differs from the channel IDs associated with the data processed by decryption engine 43. By scheduling encryption engine 41 and decryption engine 43 to perform key-diverse operations concurrently, scheduler 3 generates cross-engine signal interference in the overall power trace signature output by HMD 12. This signal interference serves as noise with respect to the individual power trace signature that either SCA analyzer 7 or 9 attempts to sniff, thereby obfuscating the power traces upon which either SCA analyzer 7 or 9 in the preprocessing stage that is essential to successfully performing an SCA. In this way, scheduler 3 scrambles the attack surface of HMD 12 using existing hardware infrastructure, thereby improving data security while not requiring additional hardware resources or compromises to the form factor HMD 12.

In some examples, if scheduler 3 determines that encryption engine 41 has data ready to be encrypted but decryption engine 43 is inactive due to data unavailability, scheduler 3 may cause encryption engine 41 to hold the raw data and begin encryption only upon decryption engine 43 receiving encrypted data and being ready to begin decryption of the encrypted data. Similarly, in some examples, if scheduler 3 determines that decryption engine 43 has encrypted data ready to be decrypted but encryption engine 41 is inactive due to data unavailability, scheduler 3 may cause decryption engine 43 to hold the encrypted data and begin decryption only upon encryption engine 41 receiving raw data and being ready to begin encryption of the raw data. In this way, scheduler 3 implements certain techniques of this disclosure to adjust the start times of encryption or decryption to generate cross-engine noise while ensuring that encryption engine 41 and decryption engine 43 process that needs to be communicated (or has been communicated) between HMD SoC 2 and peripheral SoC 4.

In other examples, scheduler 3 may generate the power trace signature-obfuscating signal noise of this disclosure by injecting dummy or decoy traffic into either encryption engine 41 or decryption engine 43 if only one engine has data ready to be processed. In one example, scheduler 3 may inject decoy traffic into decryption engine 43 for decryption, if scheduler 3 determines that decryption engine 43 is inactive and that encryption engine 41 has raw data ready for encryption. In these examples, a security processor of processor(s) 48 may select a decryption key for decryption engine 43 to apply to the decoy traffic that is different from the encryption key selected (based on channel ID correspondence) for encryption engine 41 to apply to the raw data that is ready for encryption. In this example, once encryption engine 41 becomes inactive or decryption engine 43 receives decapsulated encrypted data for decryption, processor(s) 48 may discard the decrypted decoy data without storing it to on-chip memory 54 or to shared memory 52.

In another example, scheduler 3 may inject decoy traffic into encryption engine 41 for encryption, if scheduler 3 determines that encryption engine 41 is inactive and that decryption engine 43 has decapsulated encrypted data ready for decryption. In these examples, a security processor of processor(s) 48 may select an encryption key for encryption engine 41 to apply to the decoy traffic that is different from the decryption key selected (based on channel ID correspondence) for decryption engine 43 to apply to the decapsulated encrypted data that is ready for decryption. In this example, once decryption engine 43 becomes inactive or encryption engine 41 receives raw data ready for decryption, processor(s) 48 may discard the encrypted decoy data without sending it to peripheral SoC 4.

Implementations of this disclosure in which scheduler 3 injects decoy traffic to cause the cross-engine signal interference include several different examples. For instance, scheduler 3 may inject decoy traffic in response to different stimuli according to different decoy traffic-based power trace obfuscation. In one example, scheduler 3 may inject decoy traffic into the inactive engine in immediate response or short-time response to detecting that the other engine has data ready to be processed. In another example, scheduler 3 may inject decoy traffic into the inactive engine upon expiry of a threshold wait time for the inactive engine to receive data for encryption/decryption while the other active engine holds data for processing in parallel. In the latter example, scheduler 3 may, in some scenarios, allow for some latency on a backlogged (Tx or Rx) channel before invoking decoy traffic-based power trace signature obfuscation of this disclosure.

Each of processors 48 and 68 may comprise any one or more of a multi-core processor, a controller, a digital signal processor (DSP), an application specific integrated circuit (ASIC), a field-programmable gate array (FPGA), processing circuitry (e.g., fixed-function circuitry or programmable circuitry or any combination thereof) or equivalent discrete or integrated logic circuitry. Any one or more of shared memory 52, shared memory 76, on-chip memory 54, or on-chip memory 66 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), or flash memory.

Figure 4:
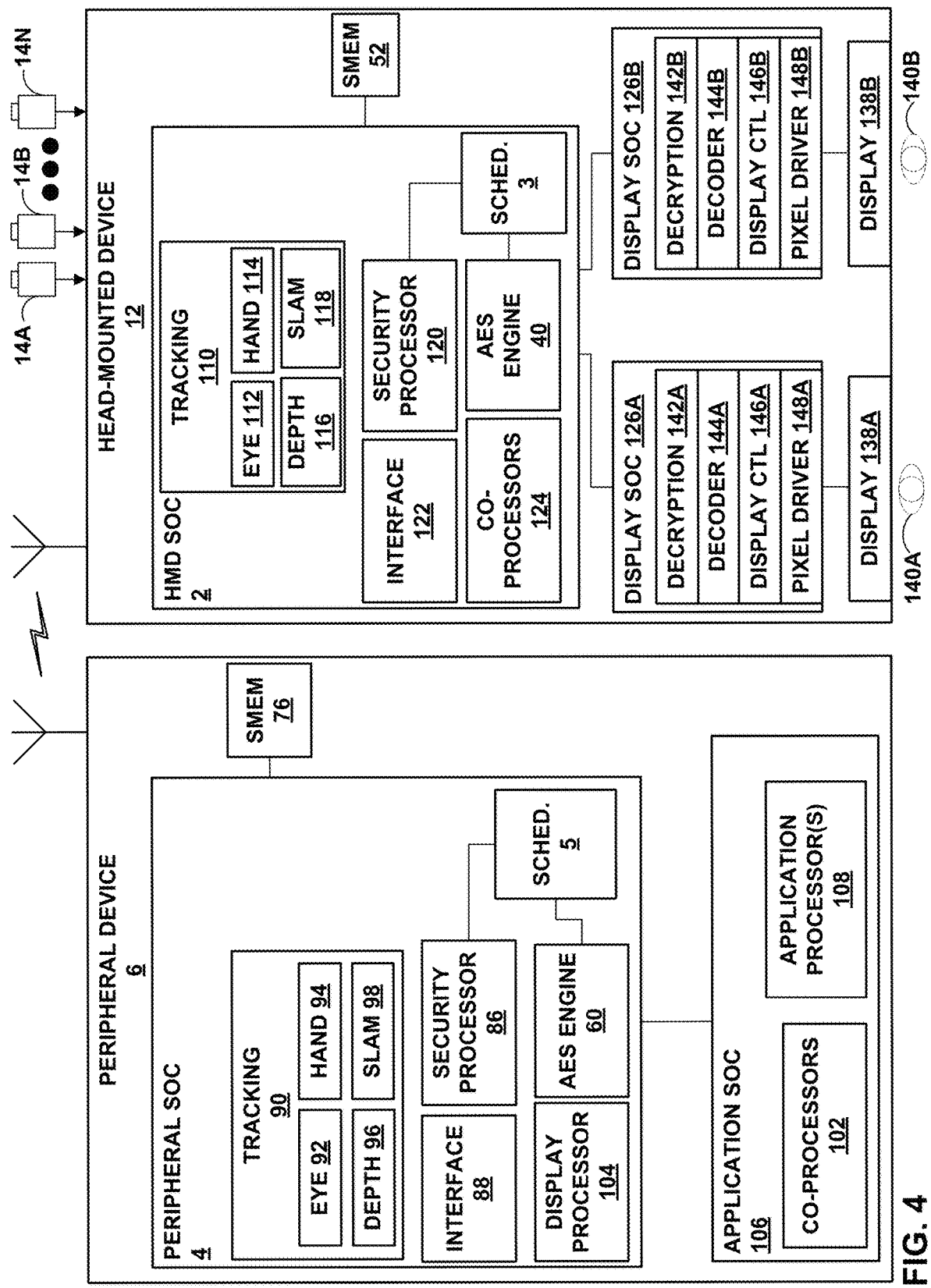
FIG. 4 is a block diagram illustrating a more detailed example implementation of a distributed architecture for a multi-device artificial reality system in which two or more devices are implemented using one or more system on a chip (SoC) integrated circuits within each device.

FIG. 4 is a block diagram illustrating a more detailed example implementation of a distributed architecture for a portion of multi-device artificial reality systems 10 and 20, in which two or more devices are implemented using respective SoC integrated circuits within each device. FIG. 4 illustrates an example in which HMD 12 operating in conjunction with peripheral device 6. Again, peripheral device 6 represents a physical, real-world device having a surface on which multi-device artificial reality systems 10 or 20 overlay virtual content. Peripheral device 6 includes one or more presence-sensitive surface(s) 38 for detecting user inputs by detecting a presence of one or more objects (e.g., fingers, stylus, etc.) touching or hovering over locations of presence-sensitive surfaces) 38.

In some examples, peripheral device 6 may have a form factor similar to any of a smartphone, a tablet computer, a personal digital assistant (PDA), or other hand-held device. In other examples, peripheral device 6 may have the form factor of a smartwatch, a so-called "smart ring," or other wearable device. Peripheral device 6 may also be part of a kiosk or other stationary or mobile system. Presence-sensitive surface(s) 38 may incorporate output components, such as display device(s) for outputting visual content to a screen. As described above, HMD 12 is architected and configured to enable the execution of artificial reality applications.

Each of HMD SoC 2, peripheral SoC 4, and the other SoCs illustrated in FIG. 4 represent specialized integrated circuits arranged in a distributed architecture, where each SoC integrated circuit includes various specialized functional blocks configured to provide an operating environment for artificial reality applications. FIG. 4 is merely one example arrangement of SoC integrated circuits that peripheral device 6 and HMD 12. The distributed architecture for multi-device artificial reality systems 10 and 20 may include any collection and/or arrangement of SoC integrated circuits.

In the example of FIG. 4, HMD SoC 2 of HMD 12 comprises functional blocks including tracking 110, security processor 120, interface 122, co-processors 124, and AES engine 40. AES engine 40 include encryption engine 44 and decryption engine 46 implemented separately in silicon. Tracking 110 provides a functional block for eye tracking 112 ("eye 112"), hand tracking 114 ("hand 114"), depth tracking 116 ("depth 116"), and Simultaneous Localization and Mapping (SLAM) 118 ("SLAM 118").

For example, HMD 12 may receive input from one or more accelerometers (e.g., quantities represented in inertial measurement units or "IMUS") that output data indicative of current acceleration of HMD 12, GPS sensors that output data indicative of a location of HMD 12, radar or sonar that output data indicative of distances of HMD 12 from various objects, or other sensors that provide indications of a location or orientation of HMD 12 or other objects within a physical environment. HMD 12 may also receive image data from one or more image capture devices 14A-14N (collectively, "image capture devices 14").

Image capture devices 14 may include various inward-facing and/or outward-facing image capture hardware, including one or more of still cameras, video cameras, laser scanners, Doppler® radar scanners, fundal photography hardware, infrared imaging hardware depth scanners, or the like, configured to output image data representative of the physical environment. Image capture devices 14 capture image data representative of objects (including peripheral device 6 and/or hand and/or the eyes of user 8) in the physical environment that are within a field of view of image capture devices, which typically corresponds with the viewing perspective of HMD 12 or the inward-facing view of HMD 12. Based on a portion of the sensed data and/or a portion of the image data, tracking 110 determines, for example, a current pose for the frame of reference of HMD 12 and, in accordance with the current pose, renders the artificial reality content. As described above with respect to FIGS. 1A-3, AES engine 40 is a functional block configured to encrypt Tx channel data communicated to peripheral device 6 and to decrypt Rx channel data communicated from peripheral device 6 or other system.

Application co-processors 124 include various processors such as a video processing unit, graphics processing unit (GPU), digital signal processors (DSPs), encoders and/or decoders, and/or others. In accordance with the techniques described in this disclosure, all or portion(s) of a backend shell may be implemented in hardware, software, or a combination of hardware and software. For example, the backend shell of a concurrent application engine may be executed on co-application processors 124. A plurality of artificial reality applications may be concurrently executed on co-application processors 124, in some examples.

Display SoCs 126A and 126B each represent display controllers for outputting artificial reality content on respective displays, e.g., displays 138A, 138B (collectively, "displays 138"). In this example, display SoC 126A may include a display controller for display 138A to output artificial reality content for a left eye 140A of user 8. In the example of FIG. 4, display SoC 126A includes a decryption block 142A, a decoder block 144A, a display controller 146A, and a pixel driver 148A for outputting artificial reality content on display 138A. Similarly, display SoC 126B includes a display controller for display 138B to output artificial reality content for a right eye 140B of user 8. In the example of FIG. 4, display SoC 126B includes a decryption unit 142B, a decoder 144B, a display controller 146B, and/or a pixel driver 148B for generating and outputting artificial reality content on display 138B. Displays 138 may include any one or more of light-emitting diode (LED) displays, organic LEDs (OLEDs), quantum dot LEDs (QLEDs), electronic paper (E-ink) displays, liquid crystal displays (LCDs), or other types of displays for displaying digital content, such as artificial reality content 22.

Peripheral device 6 includes peripheral SoC 4 and application SOC 106 configured to support an artificial reality application. In this example, peripheral SoC 4 comprises functional blocks including AES engine 40, interface 88, tracking 90, security processor 86, and display processor 104. Tracking 90 is a functional block providing eye tracking 92 ("eye 92"), hand tracking 94 ("hand 94"), depth tracking 96 ("depth 96"), and/or simultaneous localization and mapping (SLAM) 98 ("SLAM 98").

For example, peripheral device 6 may receive input from one or more accelerometers (quantified in IMUs) that output data indicative of current acceleration of peripheral device 6, GPS sensors that output data indicative of a location of peripheral device 6, radar or sonar that output data indicative of distances of peripheral device 6 from various objects, or other sensors that provide indications of a location or orientation of peripheral device 6 or other objects within a physical environment. Peripheral device 6 may in some examples also receive image data from one or more image capture devices, such as still cameras, video cameras, laser scanners, Doppler® radar scanners, depth scanners, or the like, configured to output image data representative of the physical environment. Based on the sensed data and/or image data, tracking block 90 determines, for example, a current pose for the frame of reference of peripheral device 6 and, in accordance with the current pose, renders the artificial reality content to HMD 12.

AES engine 60 includes encryption engine 62 and decryption engine 64, implemented separately in silicon. As such, AES engine 60 is a functional block configured to encrypt Tx channel data communicated to HMD 12 and to decrypt Rx channel data communicated from HMD 12. In various examples, AES engine 60 may support symmetric key cryptography to encrypt/decrypt data using a session key (e.g., a secret symmetric key). Display processor 104 includes one or more processors such as a video processing unit, graphics processing unit, encoders and/or decoders, and/or others, for rendering artificial reality content to HMD 12.

Interface 88 includes one or more interfaces for connecting to functional blocks of HMD SoC 4. As one example, interface 88 may include peripheral component interconnect express (PCIe) slots. HMD SoC 4 may connect with application SoC 106 using interface 88. HMD SoC 4 may connect with one or more communication devices (e.g., radio transmitter) using interface 88 for communicating with other devices, such as HMD 12. Security processor 86 provides secure device attestation and mutual authentication of when pairing peripheral device 6 with devices, e.g., HMD 12, used in conjunction within the artificial reality environment. Security processor 86 may authenticate application SoC 106 of peripheral device 6.

Application SoC 106 includes application co-processors 102 and application processors 108. In this example, co-application processors 102 include various processors, such as a vision processing unit (VPU), a graphics processing unit (GPU), and/or central processing unit (CPU). Application processors 108 may include a processing unit for executing one or more artificial reality applications to generate and render, for example, a virtual user interface to a surface of peripheral device 6 and/or to detect gestures performed by user 8 with respect to peripheral device 6.

As shown in FIG. 4, HMD SoC 2 includes scheduler 3, and peripheral SoC 4 includes scheduler 5. According to aspects of this disclosure, schedulers 3 and 5 are configured to cause AES engines 40 and 60, respectively, to perform key-diverse combinations of encryption and decryption operations concurrently to cause cross-datapath signal interference. This signal interference obfuscates the power trace signatures exhibited by HMD 12 and peripheral device 6, thereby scrambling the attack surfaces exposed to SCA analyzers 7 and 9. In this way, schedulers 3 and 5 implement the techniques of this disclosure to improve data security while leveraging existing hardware infrastructure used for encryption and decryption.

Figure 5:
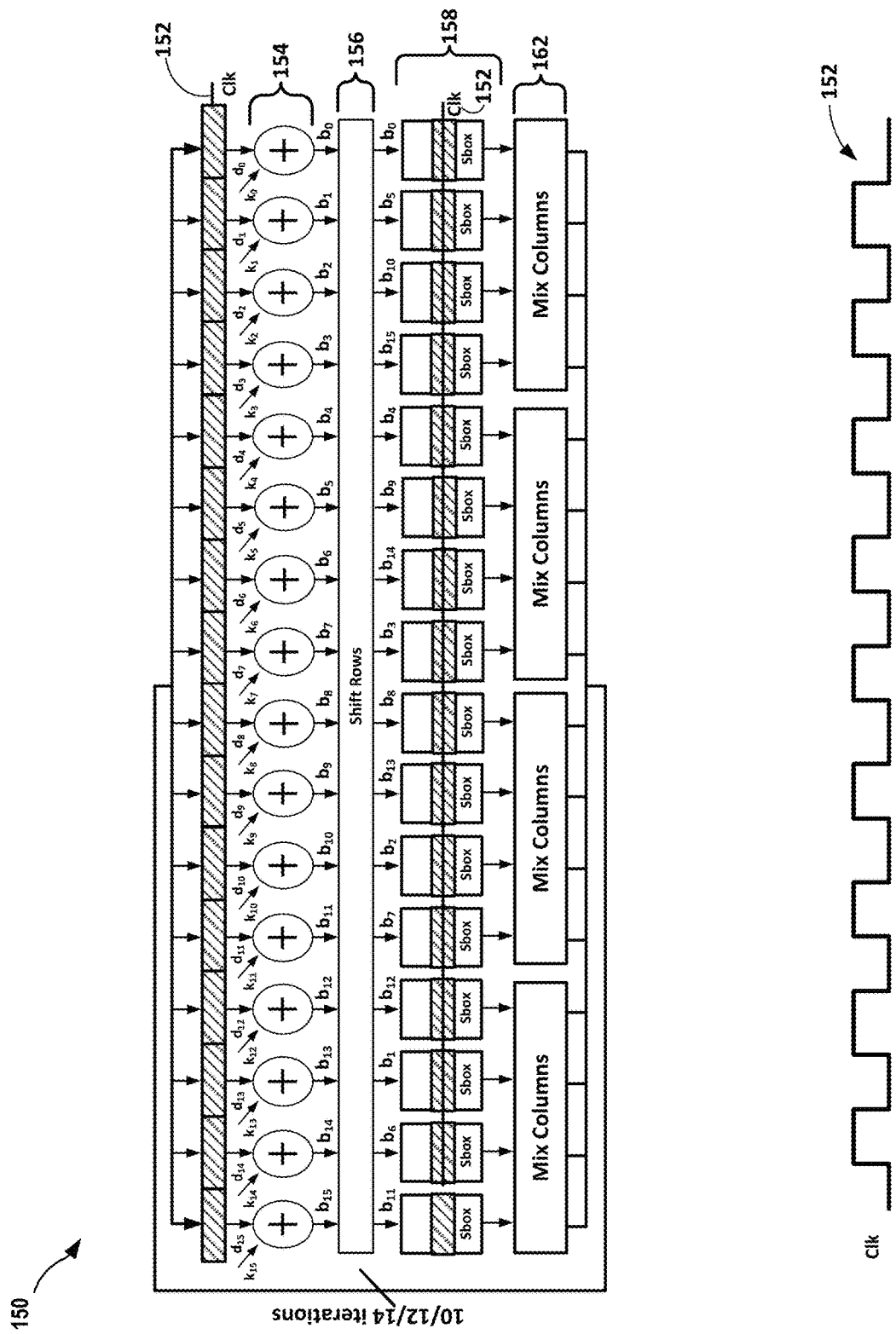
FIG. 5 is a conceptual diagram illustrating an example of an AES-compliant encryption or decryption datapath.

FIG. 5 is a conceptual diagram illustrating an example of an AES-compliant encryption or decryption datapath. The process and structure illustrated in FIG. 5 is referred to herein as AES round datapath 150. An AES-compliant encryption engine may implement AES round datapath 150 to decrypt an input block of cipher text, by performing inverse operations with respect to a reciprocal encryption datapath that generates cipher text from unencrypted input data. Various aspects of AES round datapath 150 operate according to master clock 152. The clock rate of master clock 152 is described as being at a "full frequency" in the implementation illustrated in FIG. 5 to provide maximum decryption throughput with respect to decryption datapath 150. According to AES round datapath 150, a 16-byte (128-bit) encrypted input is provided, on a per-byte basis, to sixteen adder units as part of "add round key" step 154. In add round key step 154, each byte of the data input is added to a decryption key obtained using Rijndael's key schedule. Each input byte-key pair is shown in FIG. 5 using a "d-k" notation, using subscripts to delineate the different input bytes and the different decryption keys.

The sixteen output bytes (denoted using a "b" notation with unique subscripts) of add round key step 154 are then shifted cyclically by various offsets in a shift rows step 156. The shift rows step 156 cyclically shifts the bytes in each row by a certain offset determined for that particular row. In the shift rows step 156, the first row is left unchanged, each byte of the second row is right-shifted by an offset of one, each byte of the third row is right-shifted by an offset of two, and each byte of the fourth row is right-shifted by an offset of three. Thus, each column of the output data from shift rows step 156 includes shifted data from a column of the input data. The right-shifting operations described with respect to shift rows step 156 are generally reciprocal to left-shifting operations that are performed by a reciprocal AES-compliant encryption datapath.

The structure of the data output by the shift rows step 156 does not permit for independently operating on separate segments of the original 16-byte input, because data produced from four different block ciphers may be included in each four-byte run of the data output by the shift rows step 156. The shift rows step 156 is an iterative process that is performed in multiple passes, which, in the particular example of FIG. 5, is a ten-iteration step.

Each respective output byte of the shift rows step 156 is then passed through a respective inverse substitute byte (inverse Sbox) unit as part of inverse byte substitution computational stage 158. Decryption datapath 150 implements inverse byte substitution computational stage 158 by inverting a lookup table (LUT)-based substitution as a deciphering operation performed on the encrypted input data. In the reciprocal byte substitution step of an encryption datapath, each byte in the array output by a shift rows step is replaced with a substitute byte obtained using a LUT, which is also sometimes referred to as an 8-bit substitution box. Inverse byte substitution computational stage 158 addresses non-linearity in the cipher code received as input for AES round datapath 150.

The byte-substituted outputs of the sixteen inverse Sbox units are then provided to an array of mix columns units for performance of mix columns step 162. AES round datapath 150 includes four mix columns units, each of which receives, as input, the outputs of four contiguous inverse Sbox units. As such, each mix columns unit processes a four-byte input as part of mix columns step 162. In mix columns step 162, each mix columns unit combines the respective four-byte input using an invertible linear transformation. Each mix columns unit receives a four-byte input, and produces a four-byte output. Each four-byte input received by a respective mix columns unit is sometimes referred to as a respective "column" in the context of during mix columns step 162. Each mix columns unit of AES round datapath 150 processes the respective input column using matrix multiplication such that every single input byte affects all four output bytes. In a reciprocal encryption process, the combination of the reciprocal shift rows step and mix columns step provides diffusion in the cipher operation set.

An encryption datapath corresponding to decryption datapath 150 accepts a 16-byte (128-bit) block of unencrypted data, and adds encryption key segments (the encryption key being obtained using Rijndael's key schedule) to the unencrypted input, on a byte-by-byte basis during the corresponding "add round key" step. In a corresponding Sbox stage, the encryption datapath employs Sbox units, instead of inverse Sbox units described with respect to the decryption operations described above with respect to AES round datapath 150. Purely for the sake of brevity, a separate AES encryption datapath is not illustrated in the accompanying drawings, in light of the structural parallels between the AES-compliant encryption datapath and the decryption-based AES round datapath 150 of FIG. 5.

Figure 6:
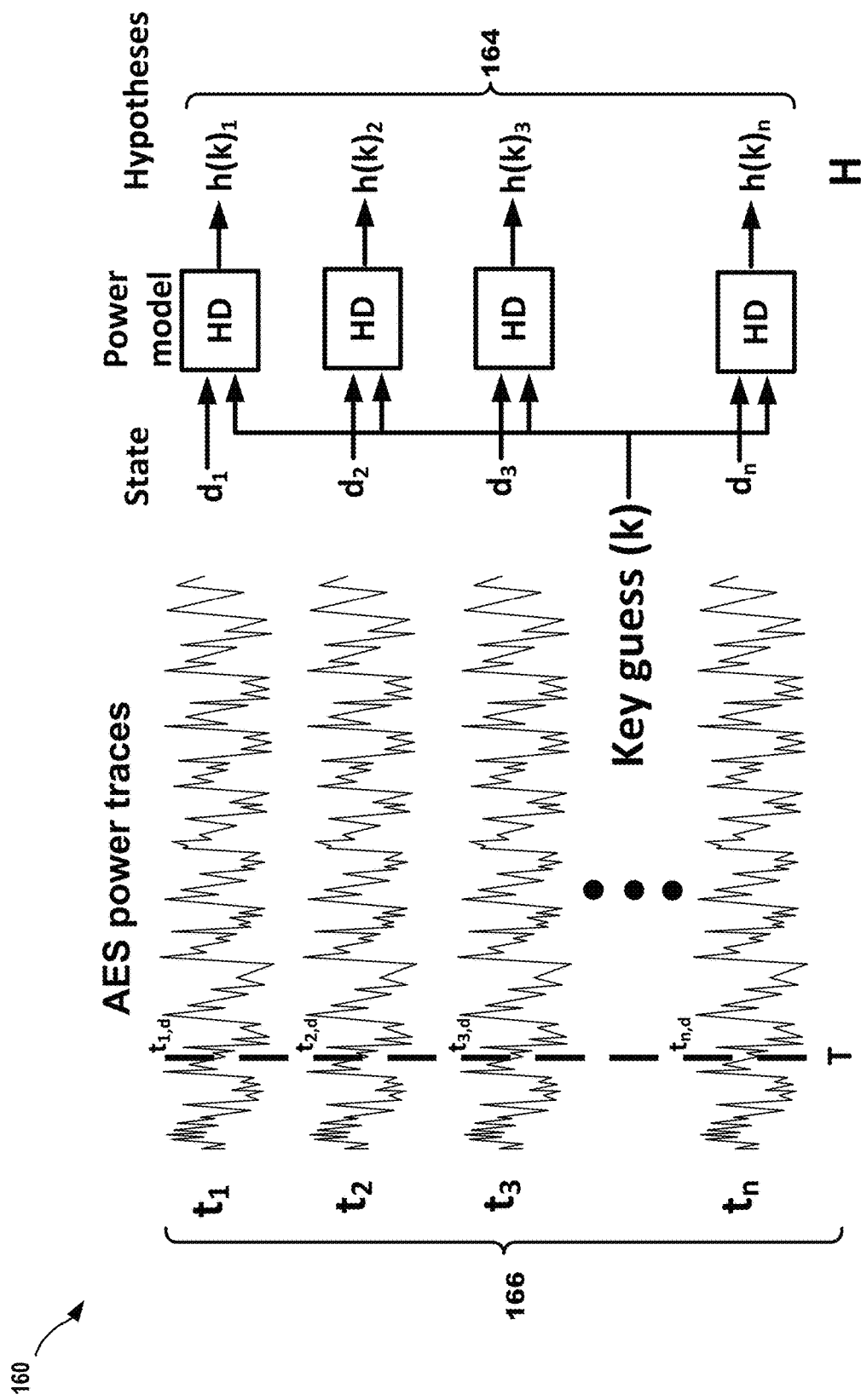
FIG. 6 is a conceptual diagram illustrating aspects of a correlation power attack (CPA).

FIG. 6 is a conceptual diagram illustrating aspects of a correlation power attack (CPA) 160. CPA 160 represents an attack that SCA analyzer 7 or SCA analyzer 9 may perform. CPA 160 is described as an attack that SCA analyzer 9 performs with respect to decryption engine 43 or decryption engine 63, as a non-limiting example. SCA analyzer 7 may also perform CPA 160 with respect to encryption engine 41 or encryption engine 61. SCA analyzer 9 may provide a number of sixteen-byte test inputs to decryption engine 43 or 63, and snoop on the power traces exhibited by the device (e.g., HMD 12 or console 16) that implements decryption engine 43 or 63 while decrypting the test inputs. For example, SCA analyzer 9 may provide one million test vectors in carrying out CPA 160.

SCA analyzer 9 maintains timestamps for the input times of the various test inputs to decryption engine 43 or 63. The timestamps that SCA analyzer 9 maintains for the full set of test inputs is illustrated in FIG. 6 as $t_1$ through $t_n$ where the subscript 'n' denotes the overall number of text inputs provided by SCA analyzer 9 (which is a value of one million in the case of many common SCA models). The underlying datasets of the respective test inputs are illustrated in FIG. 6 as $d_1$ through $d_n$. Using the respective timestamp t and the respective dataset d of a particular test input, SCA analyzer 9 conducts AES power traces 166. Again, because the AES is a publicly-available standard, potential hackers can configure SCA analyzer 9 to predict, for known input data, the expected power trace information relatively accurately.

Using datasets $d_1$ through $d_n$, SCA analyzer 9 generates key hypotheses $h(k)_1$ through $h(k)_n$ (collectively, hypotheses 164). That is, SCA analyzer 9 feeds datasets $d_1$ through $d_n$ into a key generation model. In the example of CPA 160, SCA analyzer 9 uses a hardware distance (HD) model to generate hypotheses 164 from datasets $d_1$ through $d_n$. SCA analyzer 9 also skims power traces 166 while each respective dataset d is processed by decryption engine 43 or 63. Because the data of each dataset d and the input time t of each dataset d is known to SCA analyzer 9, SCA analyzer 9 can match or determine likenesses between each AES power trace 166 and each of the 256 (calculated as 2^8 based on the 8-bit input) possible hypotheses 164.

The overall convergence of test inputs is denoted as 'T' in FIG. 6, and the overall convergence of hypotheses 164 is denoted as 'H'. SCA analyzer 9 uses the correlation of T and H (denoted as correlation (T, H)) to predict the decryption key being applied in an AES-defined decryption process. In terms of key prediction, the particular hypothesis 164 that yields the highest correlation (T, H) value tends to be correct key guess in terms of the decryption key being applied in the decryption process. In some notations, the correlation (T, H) value is expressed as a prediction operation R(k), and the correct key guess of the decryption key is the greatest R(k) value obtained from the iterative power trace-to-predicted key comparison operation. That is, the particular hypothesis 164 that maximizes the value of R(k) within the universe of AES power traces 166 tends to be the correct key guess with respect to the AES-decryption process illustrated in FIG. 5 by way of AES round datapath 150.

Figure 7:
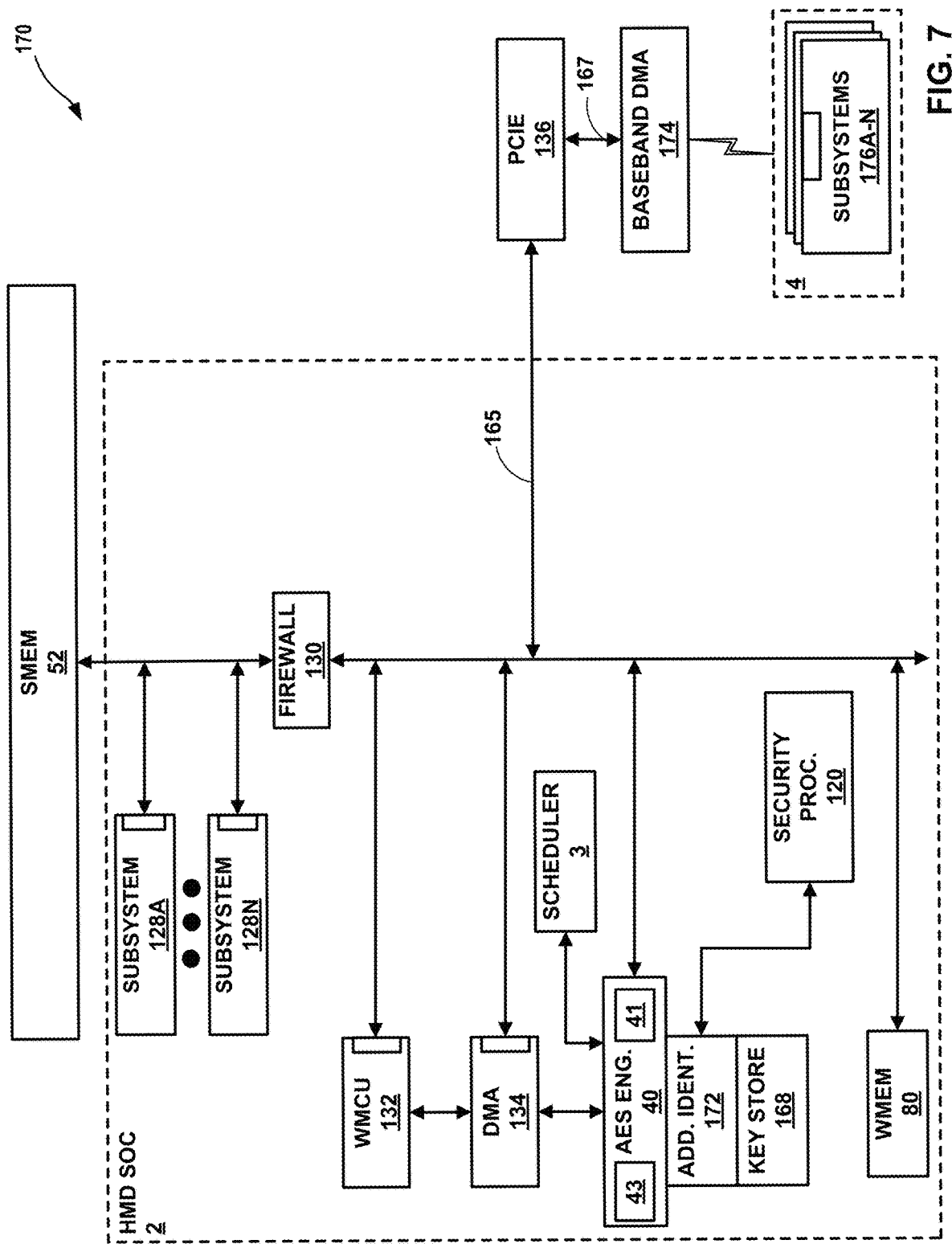
FIG. 7 is a block diagram illustrating a system of this disclosure that represents aspects of an HMD communicatively coupled a peripheral device.

FIG. 7 is a block diagram illustrating system 170 that represents example components of HMD 12 that communicate with components of peripheral device 6. In this example, system 170 includes HMD SoC 2 and shared memory 52 (or "SMEM 52" as described with respect to FIG. 7) of HMD 12. In the example shown in FIG. 7, HMD SoC 2 includes subsystems 128A through 128N (collectively, "subsystems 128"). HMD SoC 2 may include various numbers of subsystems in various examples in accordance with aspects of this disclosure.

HMD SoC 2 also includes firewall 130, a wireless microcontroller unit (WMCU) 132 and a direct memory access (DMA) unit 134, in addition to AES engine 40, wireless memory (WMEM) 80, and security processor 120, also shown in FIG. 4. HMD SoC also includes an address identifier unit 172, and a key store 168. The above-listed components of HMD SoC 2 are coupled via a shared bus 165 to PCIe interface 136. The overall connection fabric within HMD SoC 2 by which the various components connect, directly or indirectly, to shared bus 165 may incorporate network on chip (NoC) connectivity, another shared bus, hierarchical interconnect fabrics, and/or other types of connectivity. PCIe interface 136 is coupled to baseband DMA unit 174 via PCIe bus 167. Although the example implementation shown in FIG. 7 incorporates PCIe bus 167 and PCIe interface 136, HMD SoC 2 may incorporate other types of connectivity infrastructure in other examples consistent with this disclosure, such as universal serial bus (USB™) connectivity, peripheral component interconnect (PCI) connectivity, or numerous other types. With respect to crypto packets that are transmitted to peripheral SoC 4, PCIe interface 136 represents an egress interface from HMD SoC 2. With respect to crypto packets that are received from peripheral SoC 4, PCIe interface 136 represents an ingress interface to HMD SoC 2.

In general, HMD SoC 2 uses WMEM 80 to hold data on a short-term basis before being communicated to components outside of HMD SoC 2. In general, WMEM 80 holds encrypted data. With respect to Tx traffic, DMA unit 134 invokes AES engine 40 (specifically, encryption engine 41 thereof) to encrypt data, and stores the encrypted data to WMEM 80 prior to egress. With respect to Rx traffic, DMA unit 134 decapsulates crypto packets after ingress, and stores the encrypted payload data to WMEM 80 prior to further processing.

When processing Tx traffic, DMA unit 134 obtains data from SMEM 52, and invokes AES engine 40 to encrypt the data inline as the data traverses the connection fabric of HMD SoC 2. DMA unit 134 stores the encrypted data to WMEM 80. In turn, security processor 120 encapsulates the encrypted data with a plain-text header (the "encryption header" described above) to form a crypto packet. DMA unit 134 causes the crypto packet to egress from HMD SoC 2 by loading the crypto packet to PCIe interface 136. In turn, baseband DMA unit 174, which is external to HMD SoC 2, transmits the crypto packet to an SoC housed in a remote device coupled to HMD 12. For example, baseband DMA unit 174 may use a wireless chip of HMD 12 to transmit the crypto packet to peripheral SoC 4 of peripheral device 6. Any one of subsystems 176A-N ("subsystems 176") of peripheral SoC 4 may be specified as the destination for the data eventually recovered from the encrypted payload of the crypto packet.

When processing Rx traffic, DMA unit 134 obtains a crypto packet from PCIe interface 136 which, in turn, may receive the crypto packet from baseband DMA unit 174. For example, the received crypto packet may be part of Rx traffic received from peripheral SoC 4 of peripheral device 6. Security processor 120 may decapsulate the crypto packet, and DMA unit 134 may store the decapsulated encrypted payload to WMEM 80. In turn, DMA unit 134 may invoke AES engine 40 to decrypt the data inline as the data traverses the connection fabric of HMD SoC 2, and store the decrypted data to SMEM 52.

Security processor 120 determines the channel ID of data being encrypted or decrypted using source address and destination address information available from address identifier unit 172. The channel which describes the traversal endpoints, at subsystem-level granularity, of the data that is to undergo encryption (before being loaded to WMEM 80) or decryption (after being obtained from WMEM 80). Based on the channel ID determined for the data obtained by DMA unit 134, security processor 120 selects a secret key from key store 168. Security processor 120 is configured according to aspects of this disclosure to select a unique key for data belonging to each different channel ID. In turn, security processor 120 may cause AES engine 40 to encrypt/decrypt the data using the unique channel ID-selected key. In this way, security processor 120 uses the information available from address identifier unit 172 and key store 168 to enable AES engine 40 to perform multi-key encryption and multi-key decryption on a channel ID-unique basis.

Channel IDs for Rx and Tx traffic differ whether or not the two communicating subsystems are the same or different. For instance, the channel ID for crypto packet traffic with subsystem 128A as the source and subsystem 176A as the destination is different from the channel ID for crypto packet traffic with subsystem 176A as the source and subsystem 128A as the destination, based on the reversal of the direction of the traffic. Scheduler 3 leverages the channel ID diversity between Tx and Rx traffic to implement the cross-engine obfuscation techniques of this disclosure.

Scheduler 3 schedules encryption engine 41 to encrypt Tx channel payloads and decryption engine 43 to decrypt decapsulated Rx channel payloads concurrently. Because security processor 120 selects different secret keys for encryption engine 41 and decryption engine 43 based on different channel IDs associated with the data being processed, encryption engine 41 and decryption engine 43 do not apply the same key in the parallelly running encryption and decryption pipelines. Scheduler 3 implements the techniques of this disclosure to leverage this key diversity between the encryption and decryption datapaths of AES engine 40 to scramble the attack surface exposed by HMD 12. To the extent that the data availability from the Tx and Rx channel data flows permit, scheduler 3 of this disclosure activates encryption engine 41 and decryption engine 43 to execute their respective AES pipelines to process actual Tx and Rx data, thereby performing encryption and decryption operations that the inter-SoC communications between HMD SoC 2 and peripheral SoC 4 require AES engine 40 to perform. In some use case scenarios, scheduler 3 may adjust the activation time of one of encryption engine 41 or decryption engine 43 to create concurrency between the encryption and decryption datapaths, thereby causing cross-engine signal interference within AES engine 40 to obfuscate the power trace information output by HMD 12.

For instance, if scheduler 3 determines that encryption engine 41 has Tx data ready to be encrypted but decryption engine 43 is inactive due to unavailability of Rx data, scheduler 3 may cause encryption engine 41 to hold the unencrypted Rx data until decryption engine 43 receives encrypted Tx data ready to be decrypted. Conversely, in some examples, if scheduler 3 determines that decryption engine 43 has encrypted Rx data ready to be decrypted but encryption engine 41 is inactive due to unavailability of unencrypted Tx data for encryption, scheduler 3 may cause decryption engine 43 to hold the encrypted Rx data until encryption engine 41 receives unencrypted Tx data ready to be encrypted. In this way, scheduler 3 implements certain techniques of this disclosure to adjust the activation times of encryption engine 41 or decryption engine 43 to generate cross-engine noise via parallel datapath execution, while ensuring that encryption engine 41 and decryption engine 43 process that needs to be communicated (or has been communicated) between HMD SoC 2 and peripheral SoC 4.

In some instances, if scheduler 3 determines that either the Tx or Rx channel is inactive for a certain period of time, causing a backlog on the other (active) channel due to the lack of data to be processed on the backlogged channel, then control logic of the inactive engine of AES engine 40 may inject decoy traffic (or "dummy traffic") into the inactive datapath. In these examples, security processor 120 causes the inactive engine to process (encrypt or decrypt, as the case may be) the decoy traffic using a different key from the key being used to process data on the backlogged datapath. That is, scheduler 3 may, in some scenarios, allow for some latency on the backlogged channel before resorting to the use of injected decoy traffic (which is discarded without being loaded into WMEM 80 or SMEM 52, as the case may be). Control logic of encryption engine 41 and decryption engine 43 are mutually aware, and therefor enable security processor 120 to inject decoy traffic in a reactive way, based on knowledge of the inactive status of one channel.

In this way, scheduler 3 operates AES engine 40 according to aspects of this disclosure to mangle the overall power trace signature output by HMD 12. To parse the individual power trace signature corresponding to either encryption engine 41 or decryption engine 43, SCA analyzers 7 and 9 would be required to compute an EXOR of the two separate power traces, which represents a highly unlikely or potentially impossible outcome without additional information beyond the overall power trace signature.

Scheduler 5 of peripheral SoC 4 may schedule operations of encryption engine 61 and decryption engine 63 to generate signal interference within AES engine 60, thereby obfuscating the attack surface exhibited by peripheral device 6. Because of the operational parallels between the techniques implemented by scheduler 3 and scheduler 5 to prevent SCAs, the techniques of this disclosure are not described separately with respect to scheduler 5 and the remaining components of peripheral SoC 4, purely for the sake of brevity.

Figure 8:
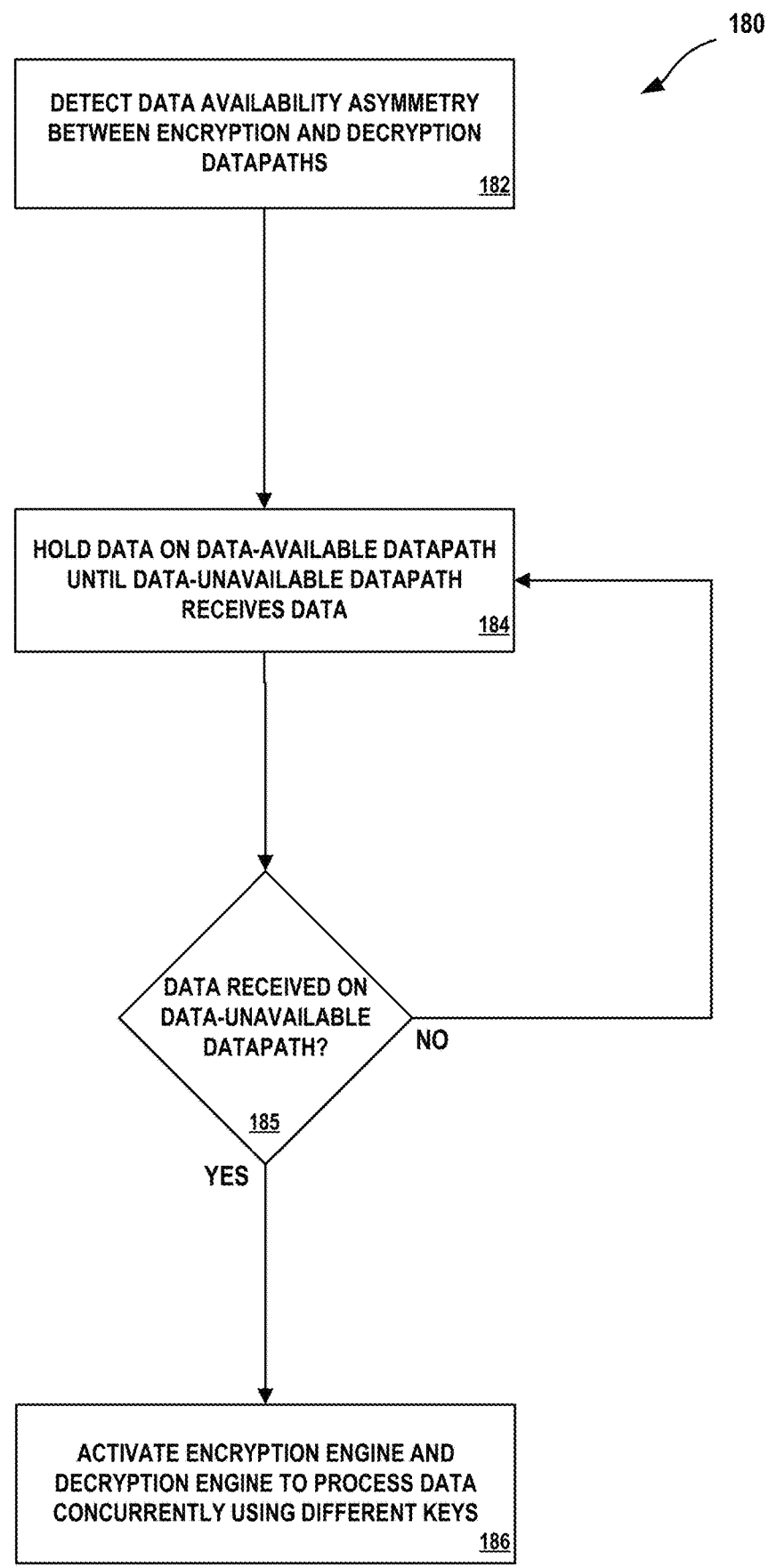
FIG. 8 is a flowchart illustrating an example process that an HMD SoC or a peripheral SoC may perform to prevent SCAs, in accordance with aspects of this disclosure.

FIG. 8 is a flowchart illustrating an example process 180 that HMD SoC 2 or peripheral SoC 4 may perform to prevent SCAs, in accordance with aspects of this disclosure. Process 180 is described as being performed by HMD SoC 2 and components thereof as a non-limiting example, and it will be appreciated that peripheral SoC 4 (and components thereof) may perform process 180 as well. Scheduler 3 may detect an asymmetry in data availability between the respective datapaths implemented by encryption engine 41 and decryption engine 43 (182). In one example, scheduler 3 may determine that Tx channel data is available to encryption engine 41 at a first time instance, but that encrypted Rx channel data is unavailable to decryption engine 43 at the first time instance, thereby creating the asymmetry in data availability between encryption engine 41 and decryption engine 43 at the first time instance. In another example, scheduler 3 may determine that Tx channel data is unavailable to encryption engine 41 at a first time instance, but that encrypted Rx channel data is available to decryption engine 43 at the first time instance, thereby creating the asymmetry in data availability between encryption engine 41 and decryption engine 43 at the first time instance, and potentially for an uninterrupted time period thereafter.

Based on the asymmetry in data availability detected at the first time instance, scheduler 3 may cause the respective engine of AES engine 40 to hold data on the data-available datapath until the data-unavailable datapath receives data for processing (184). Scheduler 3 may determine whether or not data is received on the data-unavailable datapath (decision block 185). In the example in which encryption engine 41 has raw data that is ready to be encrypted loaded from SMEM 52 while decryption engine 43 does not have decapsulated encrypted data that is ready for decryption, scheduler 3 causes encryption engine 41 to hold the raw data until decryption engine 43 receives encrypted data that is ready for decryption from WMEM 80. In the example in which decryption engine 43 has encrypted data that is ready to be decrypted loaded from WMEM 80 while encryption engine 41 does not have raw data that is ready for encryption, scheduler 3 causes decryption engine 43 to hold the encrypted data until encryption engine 41 receives raw data that is ready for encryption from SMEM 52. In either of the use-case scenarios described above (NO branch of decision block 185), scheduler 3 determines that the inactive engine receives data that is ready to be at a second time instance that is subsequent to the first time instance at which the active engine received data that is ready to be processed, and loops back to step 184. That is, scheduler 3 causes the active engine to hold the received data from the first time instance until the second time instance, or shortly after the second time instance.

If, on the other hand, scheduler 3 determines that data has become available on the previously data-unavailable datapath (YES branch of decision block 185), scheduler 3 may activate encryption engine 41 and decryption engine 43 to process (encrypt or decrypt, as the case may be) their respective loaded data using different keys (186). For example, at or shortly after the second time instance at which the inactive engine receives data loaded (from either SMEM 52 or WMEM 80, as the case may be) for processing, scheduler 3 causes encryption engine 41 to initiate the encryption datapath and decryption engine 43 to initiate the decryption datapath such that the two datapaths operate concurrently. Again, encryption engine 41 and decryption engine 43 use different keys in the concurrently operating datapaths because encryption engine 41 encrypts Tx channel traffic and decryption engine 43 decrypts Rx channel traffic.

In this way, scheduler 3 implements the techniques of this disclosure to cause encryption engine 41 and decryption engine 43 to generate key-dissonant signal interference between one another, thereby obfuscating the overall power trace signature exhibited by HMD 12. Scheduler 3 thereby prevents SCA analyzers 7 and 9 from successfully performing CPA 160, because of the obfuscation of AES power traces 166. In the case of process 180, scheduler 3 establishes concurrent data availability with respect to both encryption engine 41 and the decryption engine 43 by causing the inactive engine to hold data until the inactive engine receives data for processing.

Figure 9:
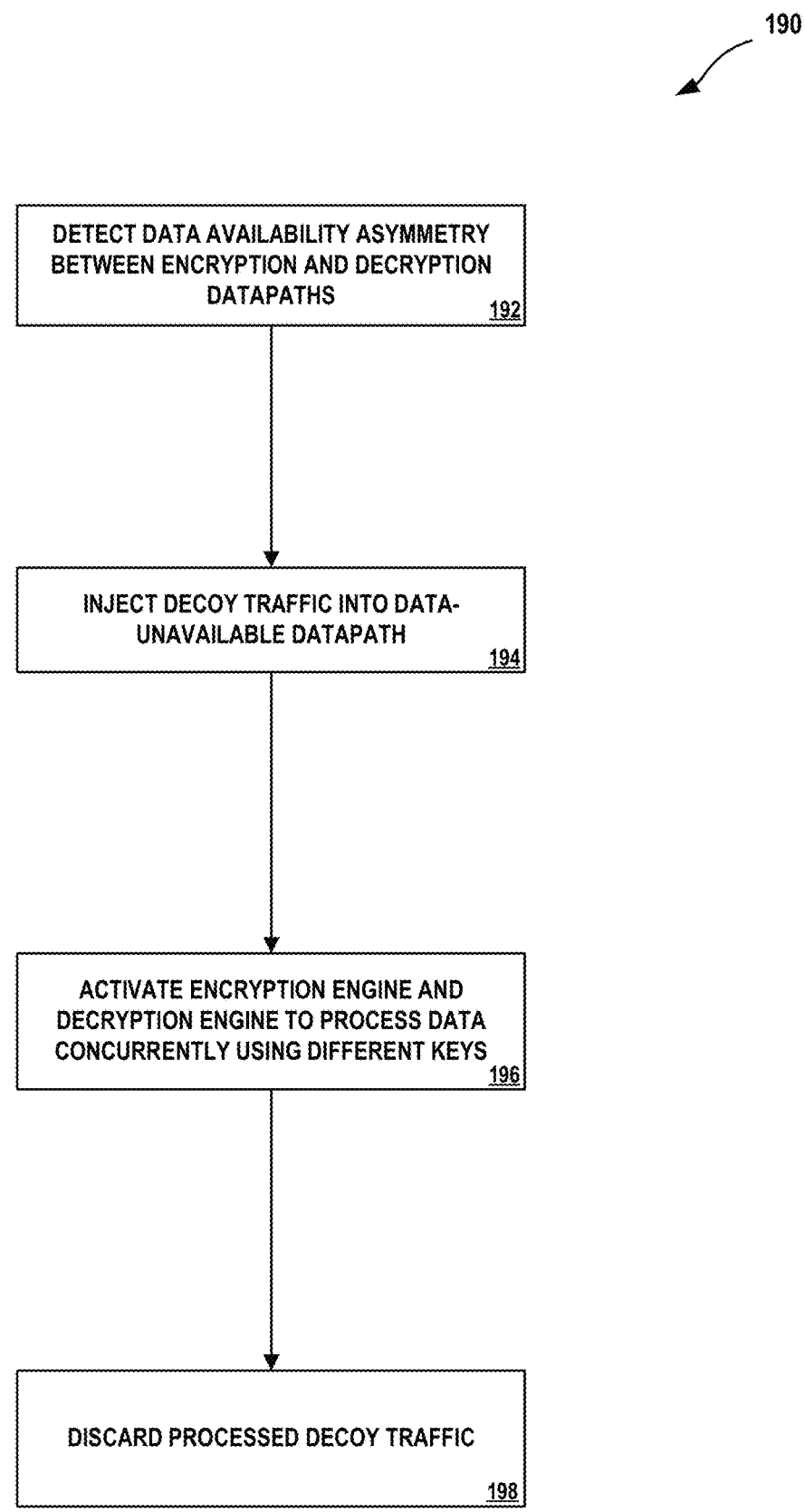
FIG. 9 is a flowchart illustrating another example process that an HMD SoC or a peripheral SoC may perform to prevent SCAs, in accordance with aspects of this disclosure.

FIG. 9 is a flowchart illustrating an example process 190 that HMD SoC 2 or peripheral SoC 4 may perform to prevent SCAs, in accordance with aspects of this disclosure. Process 190 is described as being performed by HMD SoC 2 and components thereof as a non-limiting example, and it will be appreciated that peripheral SoC 4 (and components thereof) may perform process 190 as well. Scheduler 3 may detect an asymmetry in data availability between the respective datapaths implemented by encryption engine 41 and decryption engine 43 (182). In one example, scheduler 3 may determine that Tx channel data is available to encryption engine 41 at a first time instance, but that encrypted Rx channel data is available to decryption engine 43 at the first time instance, thereby creating the asymmetry in data availability between encryption engine 41 and decryption engine 43 at the first time instance. In another example, scheduler 3 may determine that Tx channel data is unavailable to encryption engine 41 at a first time instance, but that encrypted Rx channel data is available to decryption engine 43 at the first time instance, thereby creating the asymmetry in data availability between encryption engine 41 and decryption engine 43 at the first time instance, and potentially for an uninterrupted time period thereafter.

Based on the detected asymmetry in data availability, scheduler 3 injects decoy traffic into the data-unavailable (or inactive) datapath (194). In the example in which encryption engine 41 has raw data that is ready to be encrypted loaded from SMEM 52 while decryption engine 43 does not have decapsulated encrypted data that is ready for decryption, scheduler 3 injects the decoy traffic into decryption engine 43, and security processor 120 selects, from key store 168, a decryption key that is different from the encryption key selected for encryption engine 41 to encrypt the raw data loaded from SMEM 52. In the example in which decryption engine 43 has encrypted data that is ready to be decrypted loaded from WMEM 80 while encryption engine 41 does not have raw data that is ready for encryption, scheduler 3 injects the decoy traffic into encryption engine 41, and security processor 120 selects, from key store 168, an encryption key that is different from the decryption key selected for decryption engine 43 to decrypt the raw data loaded from WMEM 80.

In some examples, scheduler 3 may inject the decoy traffic into the inactive engine based on data being unavailable to the inactive engine for at least a threshold time elapsing after the first time instance (at which the currently data-available engine received its respective data in a state that is ready for processing). In these examples, scheduler 3 permits some degree of latency on the active channel to allow for Tx or Rx channel traffic (as the case may be) to symmetrize the data availability, before resorting to the use of decoy traffic. In other examples, scheduler 3 may inject the decoy traffic into the inactive engine immediately upon detecting the asymmetry in data availability in AES engine 40, thereby maintaining throughput on the active channel without latency or with minimal latency after accounting for the decoy traffic injection.

Upon injecting the decoy traffic into the inactive engine to symmetrize the data availability between encryption engine 41 and decryption engine 43, scheduler 3 activates encryption engine 41 and decryption engine 43 to process data (encrypt or decrypt the data, as the case may be) concurrently using different keys (196). Again, security processor 120 selects different keys from key store 168 for encryption engine 41 and decryption engine 43 to use in the concurrently operating datapaths according to the techniques of this disclosure, by choosing a different key for the inactive engine as compared to the channel ID-selected key for the active engine. In this way, scheduler 3 implements the techniques of this disclosure to cause encryption engine 41 and decryption engine 43 to generate key-dissonant signal interference between one another, thereby obfuscating the overall power trace signature exhibited by HMD 12. Scheduler 3 thereby prevents SCA analyzers 7 and 9 from successfully performing CPA 160, because of the obfuscation of AES power traces 166.

In turn, DMA engine 134 discards the processed decoy traffic (198). In examples in which encryption engine 41 is invoked to encrypt decoy traffic, DMA engine 134 discards the encrypted decoy traffic before any of the encrypted decoy traffic can be loaded to WMEM 80. In examples in which decryption engine 43 is invoked to decrypt decoy traffic, DMA engine 134 discards the decrypted decoy traffic before any of the decrypted decoy traffic can be loaded to SMEM 52. In the case of process 190, scheduler 3 establishes concurrent data availability with respect to both encryption engine 41 and the decryption engine 43 by injecting decoy data on the data-unavailable datapath, thereby providing concurrent activity for both encryption engine 41 and decryption engine 43 upon activation to cause signal interference that obfuscates AES power traces 166.

Figure 10:
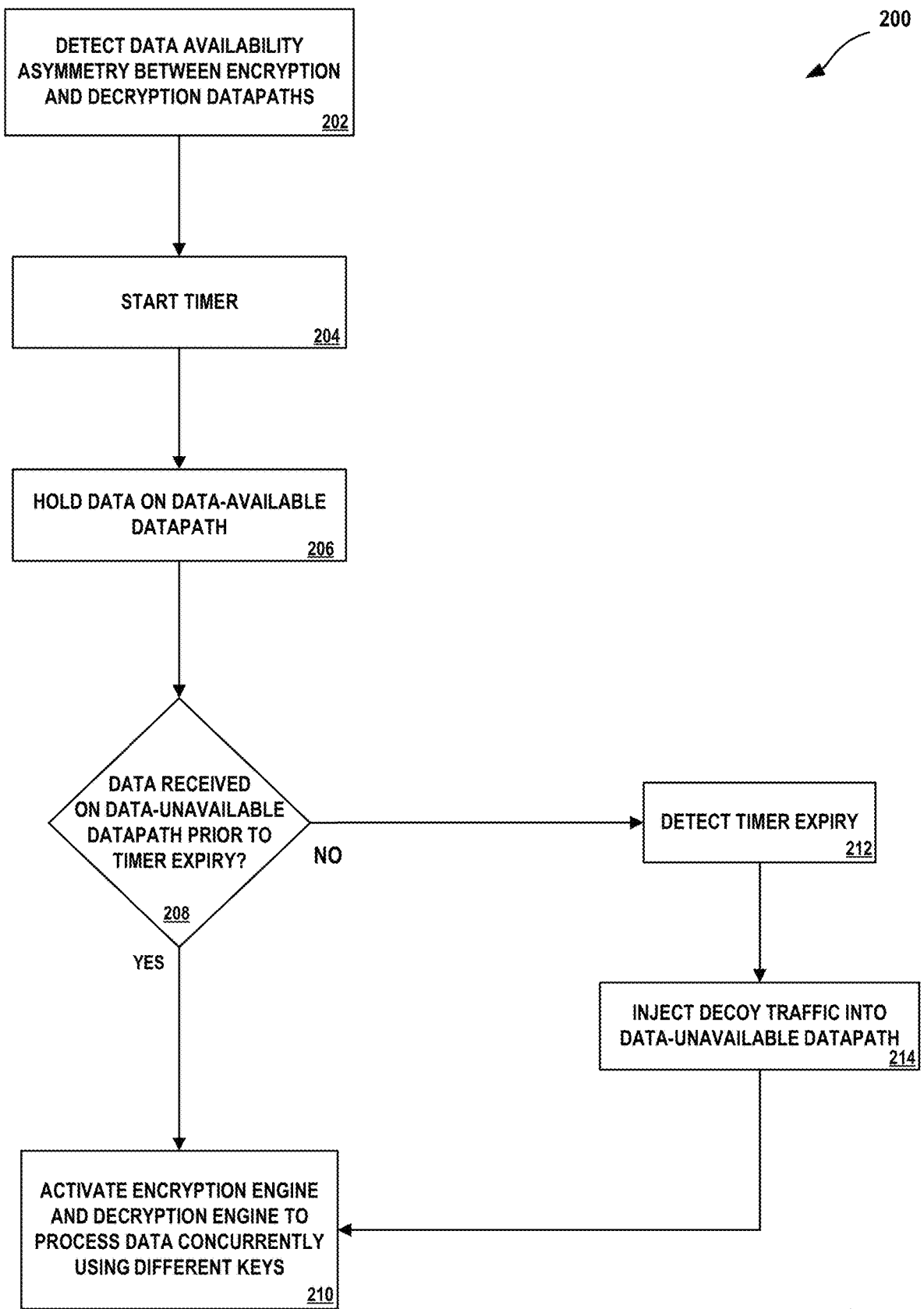
FIG. 10 is a flowchart illustrating another example process that an HMD SoC or a peripheral SoC may perform to prevent SCAs, in accordance with aspects of this disclosure.

FIG. 10 is a flowchart illustrating an example process 200 that HMD SoC 2 or peripheral SoC 4 may perform to prevent SCAs, in accordance with aspects of this disclosure. Process 200 is described as being performed by HMD SoC 2 and components thereof as a non-limiting example, and it will be appreciated that peripheral SoC 4 (and components thereof) may perform process 190 as well. Scheduler 3 may detect an asymmetry in data availability between the respective datapaths implemented by encryption engine 41 and decryption engine 43 (202). In one example, scheduler 3 may determine that Tx channel data is available to encryption engine 41 at a first time instance, but that encrypted Rx channel data is available to decryption engine 43 at the first time instance, thereby creating the asymmetry in data availability between encryption engine 41 and decryption engine 43 at the first time instance. In another example, scheduler 3 may determine that Tx channel data is unavailable to encryption engine 41 at a first time instance, but that encrypted Rx channel data is available to decryption engine 43 at the first time instance, thereby creating the asymmetry in data availability between encryption engine 41 and decryption engine 43 at the first time instance, and potentially for an uninterrupted time period thereafter.

Based on the detected asymmetry, scheduler 3 may start a timer (204). Scheduler 3 may set the timer to expire after a predetermined threshold time elapses. For example, scheduler 3 may set the timer to expire after passage of a threshold time for which the active engine (operating the data-available datapath) is to hold the available data before injection of decoy traffic on the data-unavailable datapath to trigger activation of the inactive engine of AES engine 40. Scheduler 3 may cause the active engine of AES engine 40 to hold data on the data-available datapath (184). That is, scheduler 3 causes the active engine of AES engine 40 to hold data on the data-available datapath because of the detected asymmetry in the data availability between the two engines of AES engine 40.

Scheduler 3 determines whether or not data is received on the data-unavailable datapath prior to expiry of the timer (decision block 208). If scheduler 3 determines that the inactive engine received data to encrypt/decrypt on the data-unavailable datapath prior to the expiry of the timer (YES branch of decision block 208), scheduler 3 activates both encryption engine 41 and decryption engine 43 to process (encrypt or decrypt, as the case may be) their respective loaded data using different keys (210). For example, at or shortly after the second time instance at which the inactive engine receives data loaded (from either SMEM 52 or WMEM 80, as the case may be) for processing, scheduler 3 causes encryption engine 41 to initiate the encryption datapath and decryption engine 43 to initiate the decryption datapath such that the two datapaths operate concurrently. Again, encryption engine 41 and decryption engine 43 use different keys in the concurrently operating datapaths because encryption engine 41 encrypts Tx channel traffic and decryption engine 43 decrypts Rx channel traffic. In this way, scheduler 3 implements the techniques of this disclosure to cause encryption engine 41 and decryption engine 43 to generate key-dissonant signal interference between one another, thereby obfuscating the overall power trace signature exhibited by HMD 12. Scheduler 3 thereby prevents SCA analyzers 7 and 9 from successfully performing CPA 160, because of the obfuscation of AES power traces 166.

If, however, scheduler 3 determines that the inactive engine received data to encrypt/decrypt on the data-unavailable datapath prior to the expiry of the timer (NO branch of decision block 208), scheduler 3 detects expiry of the timer (212). That is, based on the timer expiry, scheduler 3 may determine that the predetermined threshold time has elapsed after scheduler 3 detected the data availability asymmetry at step 202. In response to detecting the expiry of the timer at step 212, scheduler 3 may inject decoy traffic into the data-unavailable datapath to symmetrize the data availability between encryption engine 41 and decryption engine 43 (214). Upon injecting the decoy traffic into the inactive engine to symmetrize the data availability between encryption engine 41 and decryption engine 43, scheduler 3 activates encryption engine 41 and decryption engine 43 to process data (encrypt or decrypt the data, as the case may be) concurrently using different keys (210).

In the case of decoy traffic being injected to symmetrize the data availability skew between the two datapaths, DMA engine 134 discards the processed decoy traffic. In the case of process 200, scheduler 3 establishes concurrent data availability with respect to both encryption engine 41 and the decryption engine 43 in one of two ways, depending on the outcome of decision block 208. That is, scheduler 3 establishes the concurrent data availability with respect to both encryption engine 41 and the decryption engine 43 by injecting decoy data on the data-unavailable datapath, thereby providing concurrent activity for both encryption engine 41 and decryption engine 43 upon activation to cause signal interference that obfuscates AES power traces 166 on the NO branch of decision block 208. Scheduler 3 establishes the concurrent data availability with respect to both encryption engine 41 and the decryption engine 43 by causing the inactive engine to hold data until the inactive engine receives data for processing on the YES branch of decision block 208.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, fixed function circuitry, programmable circuitry, whether alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

What is claimed is:

1. A system on a chip (SoC) comprising:
an encryption engine configured to encrypt transmission (Tx) channel data using an encryption key;
a decryption engine configured to decrypt encrypted received (Rx) channel data using a decryption key that is different from the encryption key; and
a scheduler configured to:
establish concurrent data availability with respect to both the encryption engine and the decryption engine; and
based on the concurrent data availability with respect to both the encryption engine and the decryption engine, activate the encryption engine and the decryption engine to cause the encryption engine to encrypt the Tx channel data concurrently with the decryption engine decrypting the encrypted Rx channel data using the decryption key that is different from the encryption key.

2. The SoC of claim 1, wherein to establish the concurrent data availability with respect to both the encryption engine and the decryption engine, the scheduler is configured to:
determine that the Tx channel data is available to the encryption engine at a first time instance;
determine that the encrypted Rx channel data is unavailable to the decryption engine at the first time instance;
based on the encrypted Rx channel data being unavailable to the decryption engine at the first time instance, cause the encryption engine to hold the Tx channel data after the first time instance without encrypting the Tx channel data.

3. The SoC of claim 1,
wherein to establish the concurrent data availability with respect to both the encryption engine and the decryption engine, the scheduler is configured to:
determine that the Tx channel data is available to the encryption engine at a first time instance;
determine that the encrypted Rx channel data is unavailable to the decryption engine at the first time instance; and
based on the encrypted Rx channel data being unavailable to the decryption engine upon a threshold time elapsing after the first time instance, inject decoy traffic into the decryption engine upon the threshold time elapsing after the first time instance, and
wherein to activate the encryption engine and the decryption engine to cause the encryption engine to encrypt the Tx channel data concurrently with the decryption engine decrypting the encrypted Rx channel data, the scheduler is configured to:
activate the decryption engine to decrypt the decoy traffic; and
activate the encryption engine to encrypt the Tx channel data concurrently with the decryption engine decrypting the decoy traffic.

4. The SoC of claim 1,
wherein to establish the concurrent data availability with respect to both the encryption engine and the decryption engine, the scheduler is configured to:
determine that the encrypted Rx channel data is available to the decryption engine at a first time instance;
determine that the Tx channel data is unavailable to the encryption engine at the first time instance; and
based on the Tx channel data being unavailable to the encryption engine upon a threshold time elapsing after the first time instance, inject decoy traffic into the encryption engine upon the threshold time elapsing after the first time instance, and
wherein to activate the encryption engine and the decryption engine to cause the encryption engine to encrypt the Tx channel data concurrently with the decryption engine decrypting the encrypted Rx channel data, the scheduler is configured to:
- activate the encryption engine to encrypt the decoy traffic; and
- activate the decryption engine to decrypt the encrypted Rx channel data concurrently with the encryption engine encrypting the decoy traffic.

5. The SoC of claim 1, wherein the SoC is integrated into one of a head-mounted device (HMD) of an artificial reality system or a peripheral device of the artificial reality system.

6. The SoC of claim 1, further comprising a security processor configured to:
- select the encryption key based on the Tx channel traffic being associated with a first channel ID; and
- select the decryption key that is different from the encryption key based on the encrypted Rx channel traffic being associated with a second channel ID that is different from the first channel ID associated with the Tx channel traffic.

7. The SoC of claim 2,
wherein to establish the concurrent data availability with respect to both the encryption engine and the decryption engine, the scheduler is configured to determine that the Rx channel data is available to the decryption engine at a second time instance that is subsequent to the first time instance, and
wherein to activate the encryption engine and the decryption engine to cause the encryption engine to encrypt the Tx channel data concurrently with the decryption engine decrypting the encrypted Rx channel data, the scheduler is configured to activate, at substantially the second time instance, the encryption engine to encrypt the held Tx channel data.

8. The SoC of claim 3, further comprising a direct memory access (DMA) engine configured to discard the decrypted decoy traffic without loading the decrypted decoy traffic to a shared memory (SMEM) coupled to the DMA engine.

9. The SoC of claim 4, further comprising a direct memory access (DMA) engine configured to discard the encrypted decoy traffic without loading the encrypted decoy traffic to a wireless memory (WMEM) of the SoC.

10. A head-mounted device (HMD) comprising:
an interface; and
a system on a chip (SoC) comprising:
- an encryption engine configured to encrypt, for transmission via the interface, transmission (Tx) channel data using an encryption key;
- a decryption engine configured to decrypt encrypted received (Rx) channel data received via the interface using a decryption key that is different from the encryption key; and
- a scheduler configured to:
  - establish concurrent data availability with respect to both the encryption engine and the decryption engine; and
  - based on the concurrent data availability with respect to both the encryption engine and the decryption engine, activate the encryption engine and the decryption engine to cause the encryption engine to encrypt the Tx channel data concurrently with the decryption engine decrypting the encrypted Rx channel data using the decryption key that is different from the encryption key.

11. The HMD of claim 10, wherein to establish the concurrent data availability with respect to both the encryption engine and the decryption engine, the scheduler is configured to:
- determine that the Tx channel data is available to the encryption engine at a first time instance;
- determine that the encrypted Rx channel data is unavailable to the decryption engine at the first time instance;
- based on the encrypted Rx channel data being unavailable to the decryption engine at the first time instance, cause the encryption engine to hold the Tx channel data after the first time instance without encrypting the Tx channel data.

12. The HMD of claim 10,
wherein to establish the concurrent data availability with respect to both the encryption engine and the decryption engine, the scheduler is configured to:
- determine that the Tx channel data is available to the encryption engine at a first time instance;
- determine that the encrypted Rx channel data is unavailable to the decryption engine at the first time instance; and
- based on the encrypted Rx channel data being unavailable to the decryption engine upon a threshold time elapsing after the first time instance, inject decoy traffic into the decryption engine upon the threshold time elapsing after the first time instance, and
wherein to activate the encryption engine and the decryption engine to cause the encryption engine to encrypt the Tx channel data concurrently with the decryption engine decrypting the encrypted Rx channel data, the scheduler is configured to:
- activate the decryption engine to decrypt the decoy traffic; and
- activate the encryption engine to encrypt the Tx channel data concurrently with the decryption engine decrypting the decoy traffic.

13. The HMD of claim 10,
wherein to establish the concurrent data availability with respect to both the encryption engine and the decryption engine, the scheduler is configured to:
- determine that the encrypted Rx channel data is available to the decryption engine at a first time instance;
- determine that the Tx channel data is unavailable to the encryption engine at the first time instance; and
- based on the Tx channel data being unavailable to the encryption engine upon a threshold time elapsing after the first time instance, inject decoy traffic into the encryption engine upon the threshold time elapsing after the first time instance, and
wherein to activate the encryption engine and the decryption engine to cause the encryption engine to encrypt the Tx channel data concurrently with the decryption engine decrypting the encrypted Rx channel data, the scheduler is configured to:
- activate the encryption engine to encrypt the decoy traffic; and
- activate the decryption engine to decrypt the encrypted Rx channel data concurrently with the encryption engine encrypting the decoy traffic.

14. The HMD of claim 11,
wherein to establish the concurrent data availability with respect to both the encryption engine and the decryption engine, the scheduler is configured to determine that the Rx channel data is available to the decryption engine at a second time instance that is subsequent to the first time instance, and wherein to activate the encryption engine and the decryption engine to cause the encryption engine to encrypt the Tx channel data concurrently with the decryption engine decrypting the encrypted Rx channel data, the scheduler is further configured to activate, at substantially the second time instance, the encryption engine to encrypt the held Tx channel data.

15. The HMD of claim 12, wherein the SoC further comprises a direct memory access (DMA) engine configured to discard the decrypted decoy traffic without loading the decrypted decoy traffic to a shared memory (SMEM) of the HMD.

16. The HMD of claim 13, further comprising a direct memory access (DMA) engine configured to discard the encrypted decoy traffic without loading the encrypted decoy traffic to a wireless memory (WMEM) of the SoC.

17. A peripheral device comprising:
an interface; and
a system on a chip (SoC) comprising:
an encryption engine configured to encrypt, for transmission via the interface, transmission (Tx) channel data using an encryption key;
a decryption engine configured to decrypt encrypted received (Rx) channel data received via the interface using a decryption key that is different from the encryption key; and
a scheduler configured to:
establish concurrent data availability with respect to both the encryption engine and the decryption engine; and
based on the concurrent data availability with respect to both the encryption engine and the decryption engine, activate the encryption engine and the decryption engine to cause the encryption engine to encrypt the Tx channel data concurrently with the decryption engine decrypting the encrypted Rx channel data using the decryption key that is different from the encryption key.

18. The peripheral device of claim 17, wherein to establish the concurrent data availability with respect to both the encryption engine and the decryption engine, the scheduler is configured to:
determine that the Tx channel data is available to the encryption engine at a first time instance;
determine that the encrypted Rx channel data is unavailable to the decryption engine at the first time instance;
based on the encrypted Rx channel data being unavailable to the decryption engine at the first time instance, cause the encryption engine to hold the Tx channel data after the first time instance without encrypting the Tx channel data.

19. The peripheral device of claim 17,
wherein to establish the concurrent data availability with respect to both the encryption engine and the decryption engine, the scheduler is configured to:
determine that the Tx channel data is available to the encryption engine at a first time instance;
determine that the encrypted Rx channel data is unavailable to the decryption engine at the first time instance; and
based on the encrypted Rx channel data being unavailable to the decryption engine upon a threshold time elapsing after the first time instance, inject decoy traffic into the decryption engine upon the threshold time elapsing after the first time instance, and
wherein to activate the encryption engine and the decryption engine to cause the encryption engine to encrypt the Tx channel data concurrently with the decryption engine decrypting the encrypted Rx channel data, the scheduler is configured to:
activate the decryption engine to decrypt the decoy traffic; and
activate the encryption engine to encrypt the Tx channel data concurrently with the decryption engine decrypting the decoy traffic.

20. The peripheral device of claim 17,
wherein to establish the concurrent data availability with respect to both the encryption engine and the decryption engine, the scheduler is configured to:
determine that the encrypted Rx channel data is available to the decryption engine at a first time instance;
determine that the Tx channel data is unavailable to the encryption engine at the first time instance; and
based on the Tx channel data being unavailable to the encryption engine upon a threshold time elapsing after the first time instance, inject decoy traffic into the encryption engine upon the threshold time elapsing after the first time instance, and
wherein to activate the encryption engine and the decryption engine to cause the encryption engine to encrypt the Tx channel data concurrently with the decryption engine decrypting the encrypted Rx channel data, the scheduler is configured to:
activate the encryption engine to encrypt the decoy traffic; and
activate the decryption engine to decrypt the encrypted Rx channel data concurrently with the encryption engine encrypting the decoy traffic.

21. The peripheral device of claim 18,
wherein to establish the concurrent data availability with respect to both the encryption engine and the decryption engine, the scheduler is configured to determine that the Rx channel data is available to the decryption engine at a second time instance that is subsequent to the first time instance, and
wherein to activate the encryption engine and the decryption engine to cause the encryption engine to encrypt the Tx channel data concurrently with the decryption engine decrypting the encrypted Rx channel data, the scheduler is configured to activate, at substantially the second time instance, the encryption engine to encrypt the held Tx channel data.

22. The peripheral device of claim 19, wherein the SoC further comprises a direct memory access (DMA) engine configured to discard the decrypted decoy traffic without loading the decrypted decoy traffic to a shared memory (SMEM) of the peripheral device.

23. The peripheral device of claim 20, further comprising a direct memory access (DMA) engine configured to discard the encrypted decoy traffic without loading the encrypted decoy traffic to a wireless memory (WMEM) of the SoC.

* * * * *